US011408043B2

(12) United States Patent
Ito et al.

(10) Patent No.: US 11,408,043 B2
(45) Date of Patent: Aug. 9, 2022

(54) HEAT-PROCESSING DEVICE AND HEAT-PROCESSING METHOD

(71) Applicant: NTN CORPORATION, Osaka (JP)

(72) Inventors: Yasutoshi Ito, Shizuoka (JP); Shintaro Suzuki, Shizuoka (JP); Yoshiya Mano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 1023 days.

(21) Appl. No.: 16/078,804

(22) PCT Filed: Mar. 1, 2017

(86) PCT No.: PCT/JP2017/008169
§ 371 (c)(1),
(2) Date: Aug. 22, 2018

(87) PCT Pub. No.: WO2017/150627
PCT Pub. Date: Sep. 8, 2017

(65) Prior Publication Data
US 2019/0055618 A1 Feb. 21, 2019

(30) Foreign Application Priority Data

Mar. 2, 2016 (JP) .............................. JP2016-040120
Mar. 30, 2016 (JP) .............................. JP2016-069032

(51) Int. Cl.
*C21D 9/40* (2006.01)
*H05B 6/44* (2006.01)
(Continued)

(52) U.S. Cl.
CPC ................. *C21D 9/40* (2013.01); *C21D 1/10* (2013.01); *C21D 1/42* (2013.01); *F16C 33/64* (2013.01);
(Continued)

(58) Field of Classification Search
CPC .. C21D 9/40; C21D 1/42; F16C 33/64; H05B 6/06; H05B 6/101; H05B 6/40; H05B 6/44
See application file for complete search history.

(56) References Cited

U.S. PATENT DOCUMENTS 10,582,575 B2 * 3/2020 Kiyosawa ................ H05B 6/42
2016/0208353 A1 7/2016 Hiraoka et al.
(Continued)

FOREIGN PATENT DOCUMENTS

CN 102271433 12/2011
DE 42 28 093 4/1993
(Continued)

OTHER PUBLICATIONS

International Search Report dated Apr. 18, 2017 in International Application No. PCT/JP2017/008169.
(Continued)

*Primary Examiner* — Scott R Kastler
(74) *Attorney, Agent, or Firm* — Wenderoth, Lind & Ponack, L.L.P.

(57) ABSTRACT

Provided is a heat treatment apparatus (1), including: a heating unit (2), which is configured to inductively heat a workpiece (W) to a target temperature; and a drive mechanism, which is configured to move a plurality of the coaxially held workpieces (W) relative to the heating unit (2) being in an energized state in an axial direction of the workpiece (W), wherein the heating unit (2) includes: a plurality of coil members (11) respectively including a ring-shaped coil portion (11*a*) arranged coaxially with the workpiece (W) so as to be capable of surrounding the workpiece (W); and a frame body (21), which is configured to support each of the plurality of coil members (11) so as to be movable in the axial direction of the workpiece while (Continued)

maintaining the coaxial arrangement between the coil portions (11a).

11 Claims, 17 Drawing Sheets

(51) Int. Cl.
    *C21D 1/42*     (2006.01)
    *H05B 6/36*     (2006.01)
    *H05B 6/10*     (2006.01)
    *C21D 1/10*     (2006.01)
    *F16C 33/64*     (2006.01)
    *H05B 6/06*     (2006.01)
    *H05B 6/40*     (2006.01)

(52) U.S. Cl.
    CPC ................ *H05B 6/06* (2013.01); *H05B 6/10* (2013.01); *H05B 6/101* (2013.01); *H05B 6/36* (2013.01); *H05B 6/40* (2013.01); *H05B 6/44* (2013.01); *Y02P 10/25* (2015.11)

(56) References Cited

U.S. PATENT DOCUMENTS

2016/0230244 A1     8/2016     Hirayama et al.
2016/0316523 A1    10/2016     Inaba et al.

FOREIGN PATENT DOCUMENTS

| | | |
|---|---|---|
| JP | 48-047636 | 7/1973 |
| JP | 4-99218 | 3/1992 |
| JP | 5-214436 | 8/1993 |
| JP | 2014-225419 | 12/2014 |
| JP | 2015-67881 | 4/2015 |
| JP | 2015-67882 | 4/2015 |
| JP | 2015-118880 | 6/2015 |

OTHER PUBLICATIONS

Notice of Reasons for Refusal dated Apr. 14, 2020 in the counterpart Japanese Patent Application No. 2016-040120 with English translation.

Office Action dated Sep. 14, 2020 in corresponding Chinese Patent Application No. 201780008492.0, with English translation of Search Report.

Extended European Search Report dated Jul. 9, 2019 in counterpart European Application No. 17760091.3.

International Preliminary Report on Patentability and Written Opinion of the International Searching Authority dated Sep. 4, 2018 in International Application No. PCT/JP2017/008169.

* cited by examiner

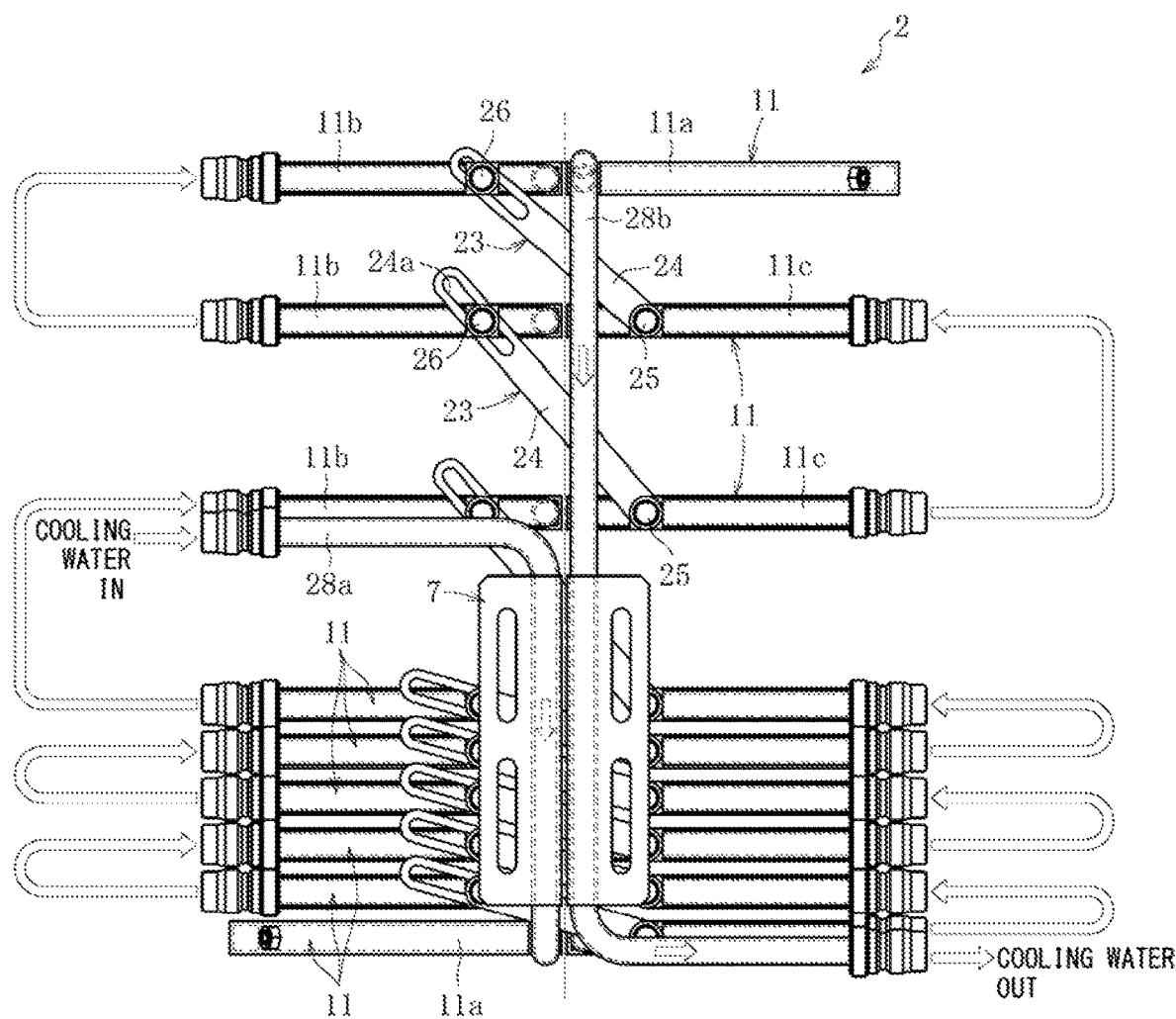

HEAT-PROCESSING DEVICE AND HEAT-PROCESSING METHOD

TECHNICAL FIELD

The present invention relates to a heat treatment apparatus and a heat treatment method, and more particularly, to a heat treatment apparatus and a heat treatment method, which perform a treatment of inductively heating a workpiece to a target temperature.

BACKGROUND ART

As is well known, in a manufacturing process for a metal member, which requires a high mechanical strength, such as a raceway ring for a rolling bearing, a heat treatment (quench hardening) for providing the mechanical strength required for the metal member is performed. The heat treatment includes a heating step of heating a workpiece to be subjected to the heat treatment to a target temperature and a cooling step of cooling the heated workpiece. The heating step can be carried out using an atmosphere heating furnace such as a mesh-belt type continuous furnace. However, the atmosphere heating furnace has some problems, for example, that an energy efficiency is low because of necessity of heating an atmosphere at the same time, and leading to increase in size of the heat treatment apparatus.

Therefore, as described in Patent Literature 1, in some cases, the workpiece is heated by high-frequency induction heating in the heating step. According to the induction heating, since the workpiece can be directly heated, high energy efficiency can be achieved, and a compact heat treatment apparatus can be realized. Further, in particular, when the workpiece to be subjected to the heat treatment is a ring-shaped member such as the raceway ring for the rolling bearing, there can be adopted a so-called "continuous heating method". The continuous heating method is a method of sequentially heating a plurality of coaxially held workpieces (ring-shaped members) by relatively moving the plurality of coaxially held workpieces and a heating coil (induction heating coil) in energized state arranged coaxially with the workpieces in an axial direction of the workpiece. The continuous heating method described above has an advantage in that each of the workpieces can be inductively heated to the target temperature in an efficient manner.

CITATION LIST

Patent Literature 1: JP 2015-67881 A

SUMMARY OF INVENTION

Technical Problem

Incidentally, in the case where a load acts on the whole of the workpiece (each parts of the workpiece in a circumferential direction of the workpiece) like the raceway ring described above, if there is a difference in strength of the each parts in the circumferential direction of the workpiece, the part having a low strength is liable to be an originating point of breakage. Such a problem may occur when, for example, a temperature of the workpiece after completion of the heating is varied in the circumferential direction. Thus, the inventors of the present application attempted to equalize the temperatures of the each parts of the workpiece in the circumferential direction by keeping the workpiece at a given temperature for a predetermined time period (soaking the workpiece) in a last stage (second half) of the heating step in which the above-mentioned continuous heating method is carried out.

In this case, as the heating coil for induction heating, a coil obtained by helically winding a coil material made of a conductive metal (hereinafter referred to as "helical coil") is generally used. In general, the helical coil has a characteristic in that an output has a higher intensity as a coil pitch becomes smaller and has a lower intensity as the coil pitch becomes larger. Therefore, at the time of performing the heat treatment in the above-mentioned mode, the inventors of the present application attempted to use a helical coil 200 having a coil pitch adjusted in a manner illustrated in FIG. 23, more specifically, the helical coil 200 with the coil pitch being set relatively small on a heating start side and the coil pitch being set relatively large on a heating end side. In this case, along with relative movement of workpieces 201 and the helical coil 200 in the axial direction of the workpiece, the workpieces 201 are first heated actively until a temperature reaches a predetermined temperature, and are then soaked.

However, even when the helical coil 200 with the coil pitch adjusted in the above-mentioned manner is used, the temperatures of the each parts of the workpiece 201 in the circumferential direction after the completion of heating are uneven. The temperatures are uneven because of, for example, coil pitch of the helical coil 200 is non-uniform in each parts in the circumferential direction of the workpiece 201 or changes in shape of the coil 200 in an undesired manner due to the change in coil pitch.

Further, in a case in which the workpieces 201 are inductively heated using the helical coil 200 as illustrated in FIG. 23 and the workpieces 201 are soaked in the final stage, for example, when workpieces having different axial dimensions (thicknesses) are used as the workpieces 201 to be subjected to the heat treatment, it is required to take a measure such as adjustment of the coil pitch of the helical coil 200. However, in order to take such measure, considerable effort and time are required. Therefore, there is a problem in that the heat treatment on the workpiece cannot be performed efficiently.

In view of the actual circumstances described above, the present invention has an object to provide technical measures capable of inductively heating a workpiece to be subjected to a heat treatment to a target temperature without varying a temperature of the workpiece among each parts in a circumferential direction of the workpiece and easily and quickly setting an optimum coil pitch (heating condition) in accordance with the workpiece.

Solution to Problem

According to one embodiment of the present invention that has been made to achieve the above-mentioned object, provided is a heat treatment apparatus, comprising: a heating unit, which is configured to inductively heat a workpiece to a target temperature; and a drive mechanism, which is configured to move a plurality of the coaxially held workpieces relative to the heating unit being in an energized state in an axial direction of the workpiece, wherein the heating unit comprises: a plurality of coil members respectively including a coil portion arranged coaxially with the workpiece so as to be capable of surrounding the workpiece, each parts of the coil portion in an extending direction of the coil portion being positioned on the same plane; and a frame body, which is configured to support each of the plurality of coil members so as to be movable in the axial direction of the workpiece while maintaining the coaxial arrangement between the coil portions.

In the heat treatment apparatus having the configuration described above, the plurality of coil members, each having the coil portion, are supported on the frame body so as to be movable in the axial direction relative to the frame body. As a result, a separation distance (coil pitch) between the coil members (coil portions) adjacent to each other in the axial direction can be easily and quickly adjusted and set. In addition, a posture of each individual coil portion can be kept in an appropriate state (posture parallel to the workpiece to be subjected to a heat treatment) even after the adjustment of the coil pitch. Further, each of the coil members is supported on the frame body in a form of being separated from and being independent of the other coil members. Thus, even after the coil pitch is adjusted, the coil pitch is not gradually changed in a circumferential direction of the workpiece, or a shape of the coil is not changed, unlike the case of adjusting the coil pitch of the helical coil 200 illustrated in FIG. 23. Therefore, the coil pitch is adjusted by moving the coil members in the axial direction so as to form a temperature increasing zone in which the coil pitch is set relatively small and a soaking zone in which the coil pitch is set relatively large. In this manner, even when the workpiece to be subjected to the heat treatment is a ring-shaped workpiece such as a raceway ring (outer ring or inner ring) for a rolling bearing, each of the workpieces can be inductively heated to the target temperature in an appropriate manner without varying a temperature of the workpiece in the circumferential direction.

The heating unit may further comprise a connecting component, which is configured to electrically connect two of the plurality of coil members being adjacent to each other. In this manner, the plurality of coil members can be electrically treated as a single multiwinding coil. Thus, a configuration of a feed circuit, which is configured to feed power to each of the coil members, can be simplified.

The connecting component may comprise: a link member; a first coupling member, which is configured to couple one end of the link member to any one of the two coil members being adjacent to each other in the axial direction of the workpiece so that the one end of the link member is rotatable relative to the one coil member; and a second coupling member, which is configured to couple another end of the link member to another of the two coil members being adjacent to each other in the axial direction of the workpiece so that the another end of the link member is slidable and rotatable relative to the another coil member. In this case, in particular, when the link member is formed of a metal rigid member, the plurality of coil members that are separated from each other can be connected not only electrically but also mechanically. Hence, ease in handling of the heating unit is improved. Further, the coil pitch can be adjusted in a stepless manner within a range of a sliding amount of the link member relative to the another coil member. Thus, it is possible to efficiently perform an adjustment work of the coil pitch.

The heating unit may further comprise a restricting member, which is removably mounted to one and another of two of the plurality of coil members being adjacent to each other in the axial direction of the workpiece, and is configured to restrict relative approaching and separating movement of the two coil members being adjacent to each other in the axial direction of the workpiece. With the restricting member described above, the coil pitch can be adjusted and set based on an axial dimension of the restricting member. Therefore, an optimum coil pitch in accordance with the workpiece can be more easily and accurately set.

When the heating unit comprises the restricting member described above, the coil member may have a first projection which engaged with the restricting member in the axial direction of the workpiece and a second projection which engaged with the restricting member in an extending direction of the coil member. In this manner, a desired coil pitch can be more easily and accurately achieved, specifically, reproducibility of the coil pitch can be enhanced. The two coil members being adjacent to each other in the axial direction of the workpiece may be electrically connected to each other through intermediation of the restricting member. In this manner, the plurality of coil members can be electrically treated as the single multiwinding coil. Thus, the configuration of the feed circuit can be simplified.

In the configuration described above, each of the plurality of coil members may be formed into a shape having ends with a tubular member made of a conductive metal. In this case, when the heating unit further comprises a communication member, which is configured to communicate internal spaces of the two coil members being adjacent to each other in the axial direction, a fluid passage can be formed with the coil members and the communication member. The fluid passage can be utilized, for example, as part of a cooling circuit through which cooling water is caused to circulate. When the cooling circuit described above is provided, temperature control for the heating unit (coil portions) can be appropriately and efficiently performed. Further, with the communication member made of a flexible material, even when the coil pitch is changed, the communication member can be deformed so as to follow the change in coil pitch. Therefore, even when the cooling circuit described above is required, time and effort to reconstruct the cooling circuit for each change in coil pitch can be saved.

Each of the plurality of coil members may be mountable to and removable from the frame body. In this manner, it can be easily dealt with, for example, an increase and decrease of the number of coil members to be provided, and a replacement of the coil member.

Further, in order to achieve the object described above, according to one embodiment of the present invention, provided is a heat treatment method, comprising a heating step of inductively heating a plurality of coaxially held workpieces to a target temperature in a sequential manner by moving the plurality of workpieces relative to a heating unit being in an energized state in an axial direction of the workpiece, wherein, in the heating step, the plurality of workpieces are heated by the heating unit, the heating unit comprising: a plurality of coil members respectively including a coil portion arranged coaxially with the workpiece so as to be capable of surrounding the workpiece, each parts of the coil portion in an extending direction of the coil portion being positioned on the same plane; and a frame body, which is configured to support each of the plurality of coil members so as to be movable in the axial direction of the workpiece while maintaining the coaxial arrangement between the coil portions.

With the heat treatment method described above, the same functions and effects as those obtained in the case in which the heat treatment apparatus according to the present invention is adopted can be enjoyed.

The heating unit used in the heat treatment method described above may further comprise a restricting member, one end and another end of the restricting member are removably mounted to one and another of two of the plurality of coil members being adjacent to each other in the axial direction of the workpiece, respectively, and is configured to restrict relative approaching and separating movement of the two coil members being adjacent to each other in the axial direction of the workpiece.

Advantageous Effects of Invention

As described above, according to the heat treatment apparatus and the heat treatment method of one embodiment of the present invention, the workpiece to be subjected to the heat treatment can be inductively heated to the target temperature without varying the temperature of the workpiece among each parts in the circumferential direction of the workpiece. In addition, an optimum coil pitch in accordance with the workpiece can be easily and quickly set. Therefore, changes in specifications, types, etc. of the workpiece to be subjected to the heat treatment can be easily and quickly dealt with.

BRIEF DESCRIPTION OF DRAWINGS

FIG. 9 is an explanatory schematic view for illustrating a flow of cooling water in the beating unit illustrated in FIG. 3.

DESCRIPTION OF EMBODIMENTS

Now, description is made of embodiments of the present invention with reference to the drawings.

Figure 1:
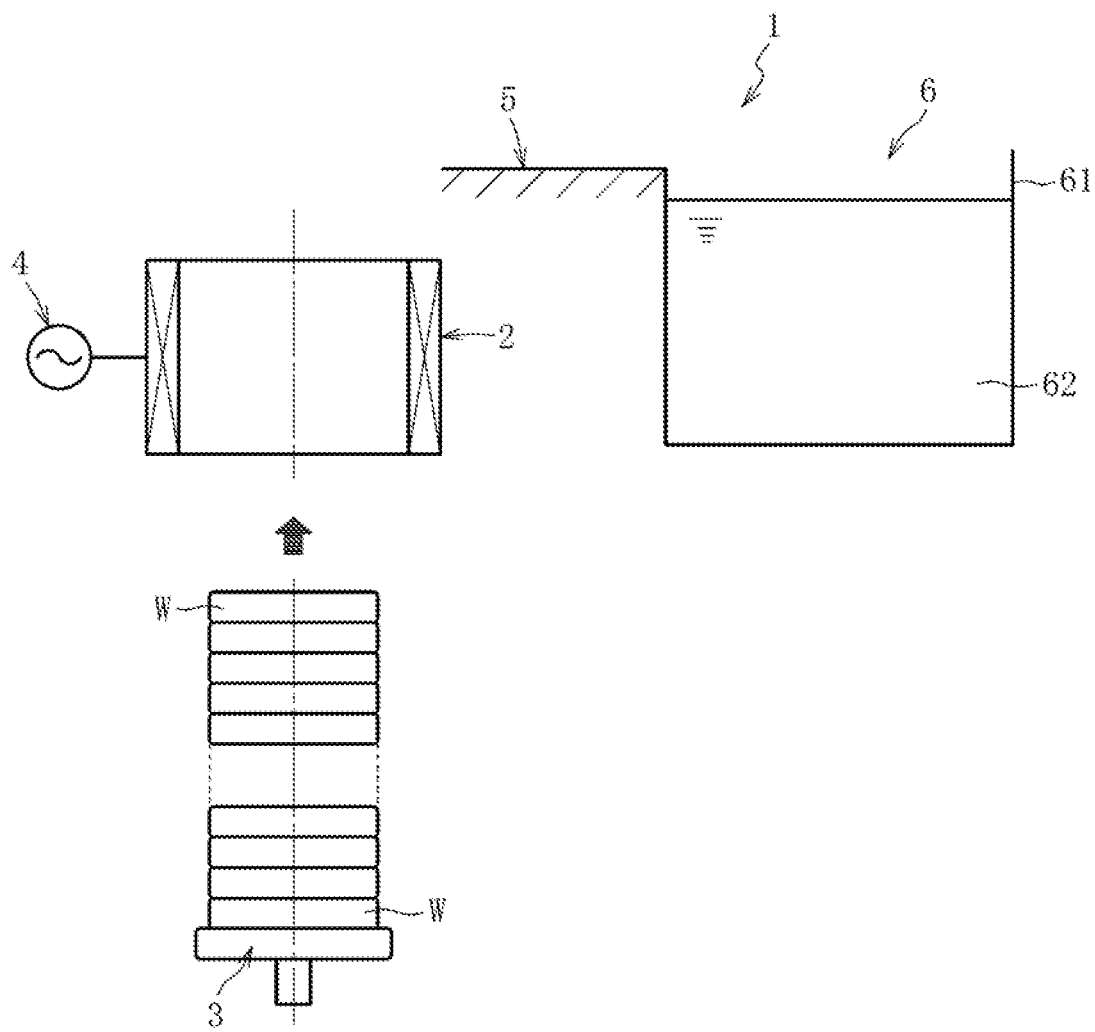
FIG. 1 is a view for schematically illustrating an overall structure of a heat treatment apparatus according to one embodiment of the present invention.
Figure 2:
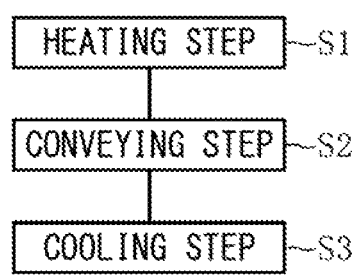
FIG. 2 is a flowchart for illustrating steps performed in the heat treatment apparatus illustrated in FIG. 1.

FIG. 1 is a view for schematically illustrating an overall structure of a heat treatment apparatus 1 according to one embodiment of the present invention. The heat treatment apparatus 1 illustrated in FIG. 1 is used to perform quench hardening as a heat treatment on a workpiece W made of steel, more specifically, for example, a ring-shaped workpiece W (for example, an outer ring for a rolling bearing) made of a steel material containing carbon at 1.0% by mass or smaller, and is configured to carry out a heating step S1, a conveying step S2, and a cooling step S3 in the stated order, as illustrated in FIG. 2.

The heat treatment apparatus 1 mainly comprises a heating unit 2, a holding part 3, a high-frequency power source 4, a conveying mechanism 5, and a cooling part 6. The heating unit 2, the holding part 3, and the high-frequency power source 4 are used in the heating step S1. The conveying mechanism 5 is used in the conveying step S2. The cooling part 6 is used in the cooling step S3. The cooling part 6 comprises a cooling liquid bath 61 that stores a cooling liquid (for example, quenching oil) 62 kept at a suitable temperature. The conveying mechanism 5 comprises, for example, a belt conveyor.

The heating unit 2 and the holding part 3 that are used in the heating step S1 are now described in detail mainly for the heating unit 2 with reference to FIG. 3 to FIG. 10.

The holding part 3 of the illustrated example is configured to coaxially hold a plurality of workpieces W to be subjected to the heat treatment, and more particularly, coaxially holds the plurality of workpieces W in a stacked state in which the workpieces W are stacked in multiple levels. The plurality of workpieces W held by the holding part 3 are intermittently fed upward by a predetermined dimension in response to an output from a drive mechanism (not shown) to be sequentially introduced into an inner periphery of the heating unit 2.

Figure 3:
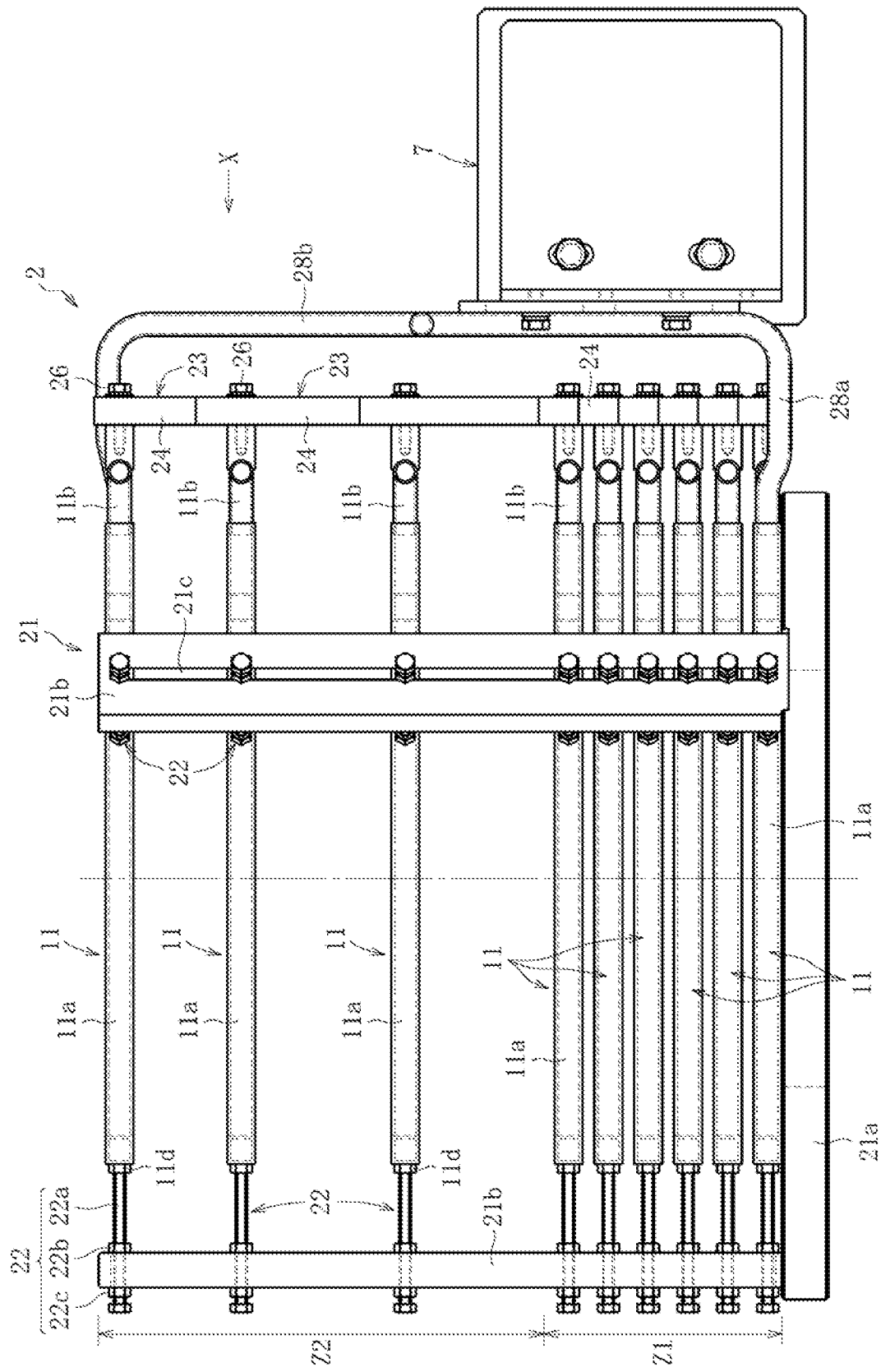
FIG. 3 is a front view of a heating unit in a first embodiment of the present invention.
Figure 4:
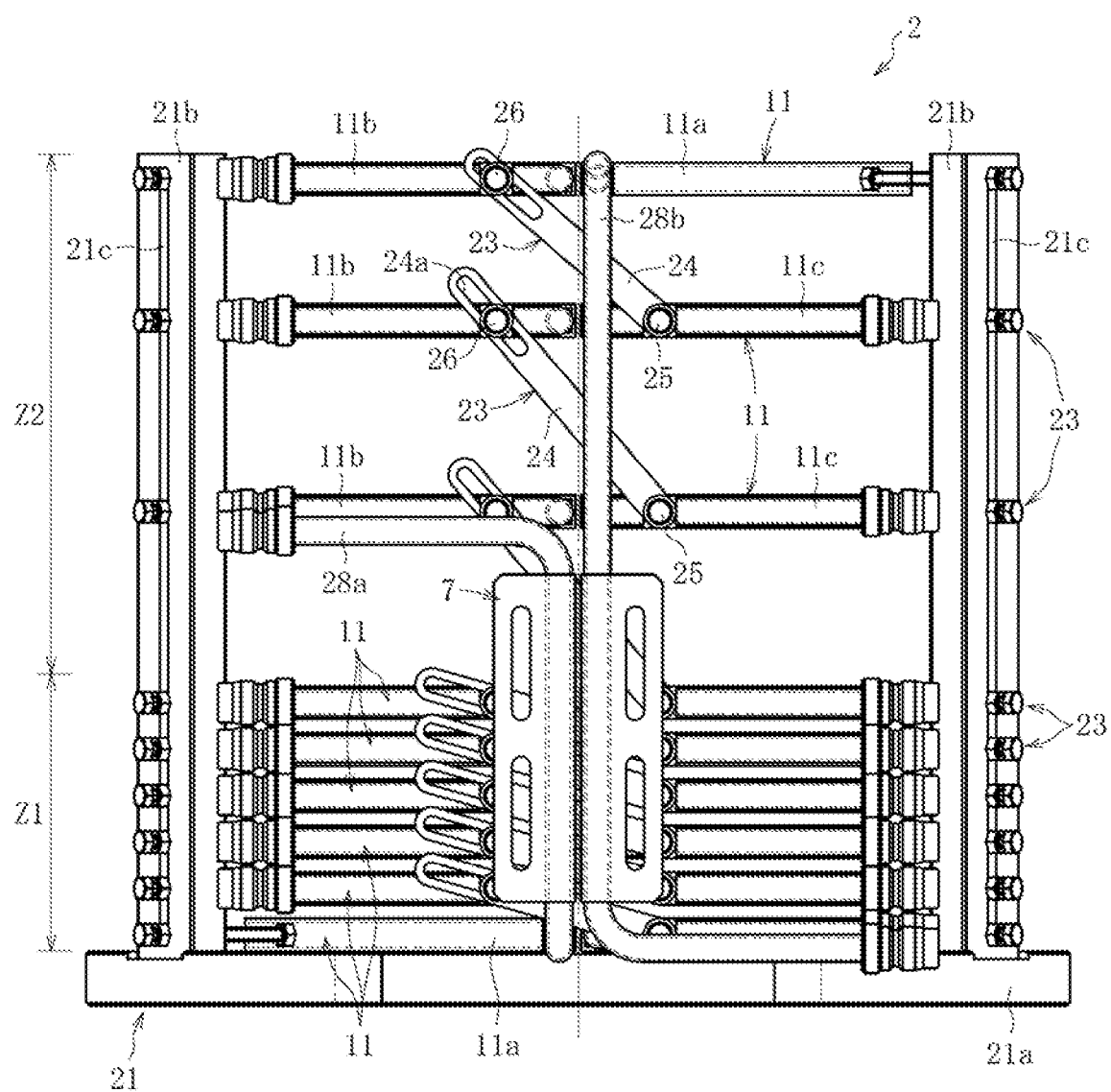
FIG. 4 is a side view of the heating unit illustrated in FIG. 3 (when the heating unit is viewed in a direction indicated by the arrow X in FIG. 3).
Figure 5:
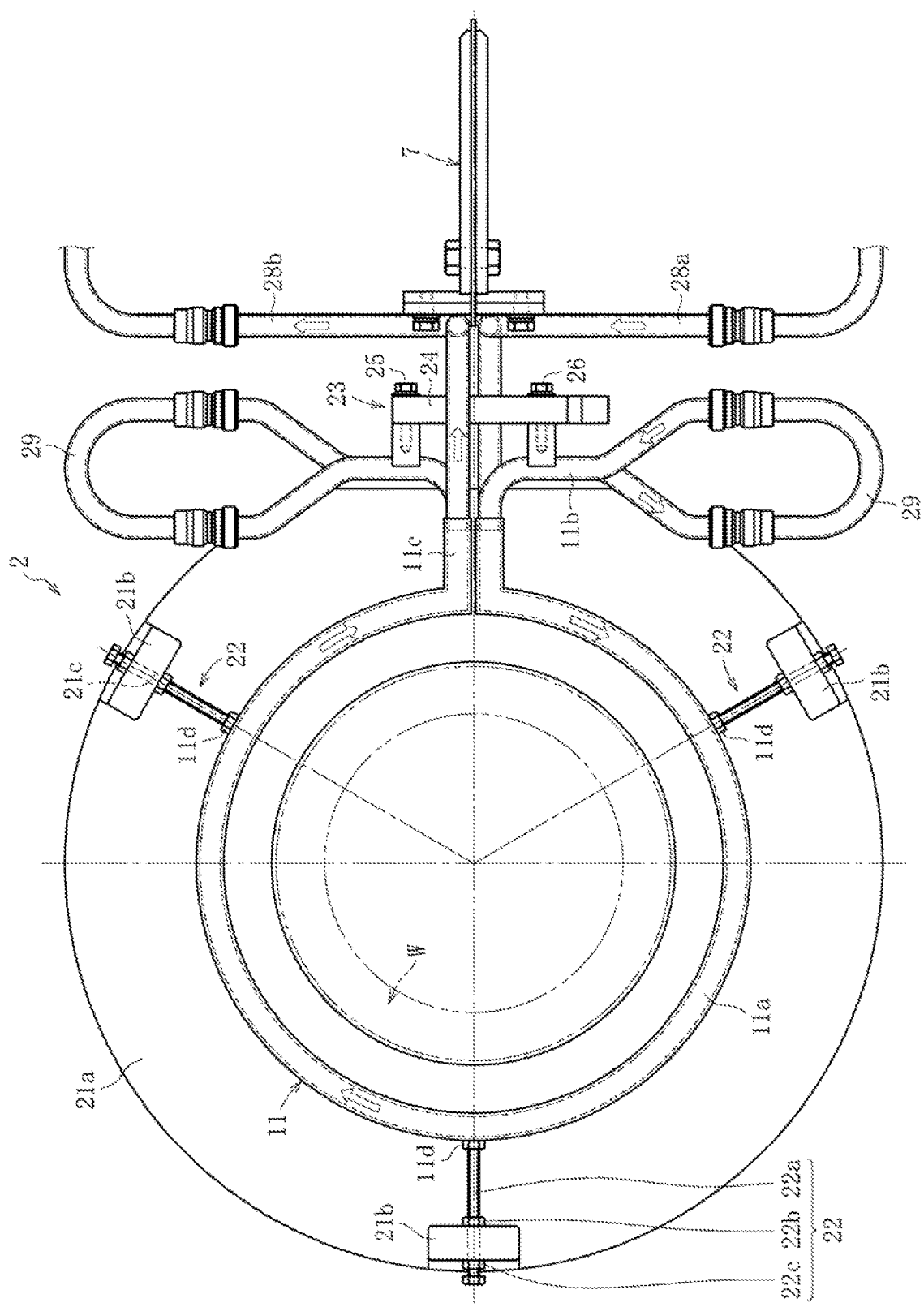
FIG. 5 is a top view of the heating unit illustrated in FIG. 3.

As illustrated in FIG. 3 to FIG. 5, the heating unit 2 comprises a plurality of (nine in the illustrated example) coil members 11, a frame body 21, and a relay component 7. The coil members 11 are arranged in multiple levels along an axial direction (vertical direction) of the workpiece W held by the holding part 3. The frame body 21 supports each of the coil members 11 so that the coil members 11 can be moved upward and downward. The relay component 7 is configured to bring electrodes provided to the coil members 11 and an electrode of the high-frequency power source 4 (see FIG. 1) into contact with each other to energize the coil members 11.

Figure 6:
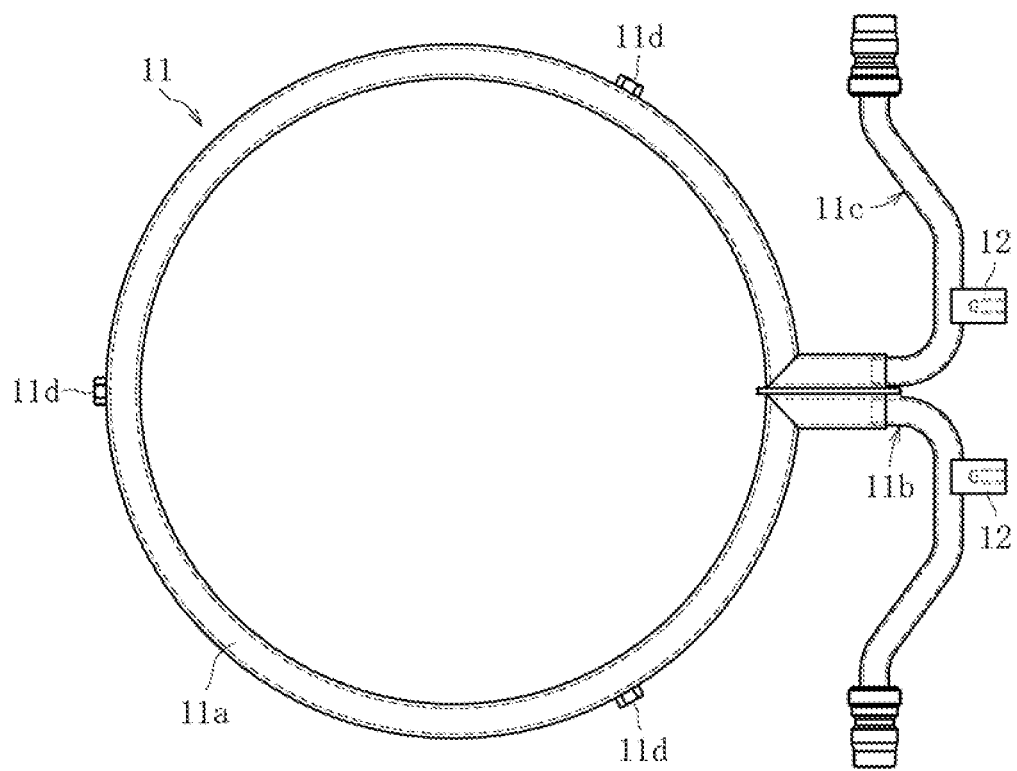
FIG. 6 is a plan view of one coil member which forms the heating unit illustrated in FIG. 3.
Figure 7:
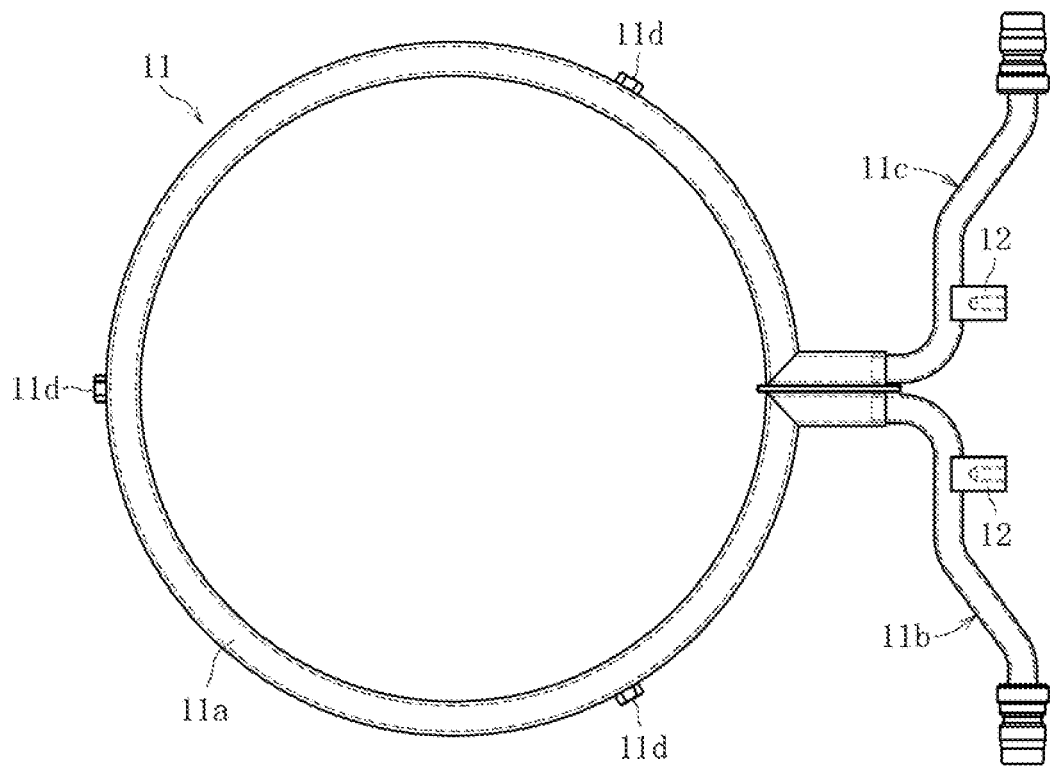
FIG. 7 is a plan view of another coil member which forms the heating unit illustrated in FIG. 3.

As illustrated in FIG. 5, each of the coil members 11 comprises a coil portion 11a. The coil portion 11a is arranged coaxially with the workpieces W held by the holding part 3 (see FIG. 1), and is formed into a ring shape having ends in a circumferential direction of the workpiece W so as to be capable of surrounding the workpiece W. Further, each of the coil members 11 has extending portions 11b and 11c respectively extending from one circumferential end and another circumferential end of the coil portion 11a, to which other members, more specifically, a connecting component 23 described later and communication members 29 that form a cooling circuit, are mounted. Shapes of the extending portions 11b and 11c are suitably determined mainly in accordance with a mode of formation of the cooling circuit. In this embodiment, two kinds of coil members 11 having the shapes of the extending portions 11b and 11c being different from each other are arranged alternately between the uppermost coil member 11 and the lowermost coil member 11. One of the two kinds of coil members 11 is illustrated in FIG. 6, and another thereof is illustrated in FIG. 7. Distal ends (free ends) of the extending portions 11b and 11c are arranged at positions relatively close to the coil portion 11a in the one coil member 11 illustrated in FIG. 6, whereas the free ends of the extending portions 11b and 11c are arranged at positions relatively away from the coil portion 11a in the another coil member 11 illustrated in FIG. 7. These arrangements are used to prevent the extending portions 11b and 11c of the adjacent coil members 11 from interfering with each other.

Each of the coil members 11 is formed into a shape having ends by curving a tubular member made of a conductive metal, for example, a copper pipe. At least each parts of the coil portion 11a in an extending direction (circumferential direction) thereof are positioned on the same plane. As illustrated in FIG. 3 and FIG. 4, each of the coil members 11 is supported on the frame body 21 while being in a horizontal posture in which a center axis of the coil portion 11a thereof matches a center axis of the coil portion 11a of the another coil member 11.

As illustrated in FIG. 3 to FIG. 5, the frame body 21 comprises a seat 21a and a plurality of (three in this embodiment) support columns 21b. The seat 21a is arranged below the lowermost coil member 11. The support columns 21b are provided upright on the seat 21a. Each of the coil members 11 is supported on the frame body 21 through support components 22 that are provided at three positions separated from each other in the circumferential direction of the coil portion 11a. A guide portion 21c, which is configured to guide the upward and downward movement of the coil member 11, is formed in each of the support columns 21b. The guide portion 21c comprises an elongated through hole extending in the vertical direction. Each of the seat 21a and the support columns 21b is made of an insulating material.

Each of the support components 22 comprises a bolt member 22a, a first nut 22b, and a second nut 22c. The bolt member 22a has a radially inner end to be fastened to a nut 11d fixed to an outer periphery of the coil member 11, and a radially outer end with a vicinity thereof to be inserted into the guide portion 21c of the corresponding support column 21b. The first nut 22b is arranged on a radially inner side of the support column 21b, and the second nut 22c is arranged on a radially outer side of the support column 21b. The first nut 22b and the second nut 22c are threadably fixed to the bolt member 22a so as to be capable of moving closer and away relative to each other. With the configuration described above, when the nuts 22b and 22c are moved closer relative to each other in each of the support components 22 provided at the three positions in the circumferential direction to sandwich the support column 21b therebetween, each of the coil members 11 is fixedly supported at a predetermined position in the vertical direction. On the contrary, when the nuts 22b and 22c are moved away relative to each other in each of the support components 22 to release a force of sandwiching the support column 21b, the coil member 11 can be moved upward and downward, specifically, a position of fixation and a posture of the coil member 11 in the vertical direction can be adjusted. Further, with the configuration described above, when the bolt members 22a are removed from the nuts 11d in all the support components 22 provided to each of the coil members 11, the coil member 11 can be removed from the frame body 21. Therefore, each of the coil members 11 can be moved upward and downward relative to the frame body 21, and can also be mounted to and removed from the frame body 21.

Figure 10:
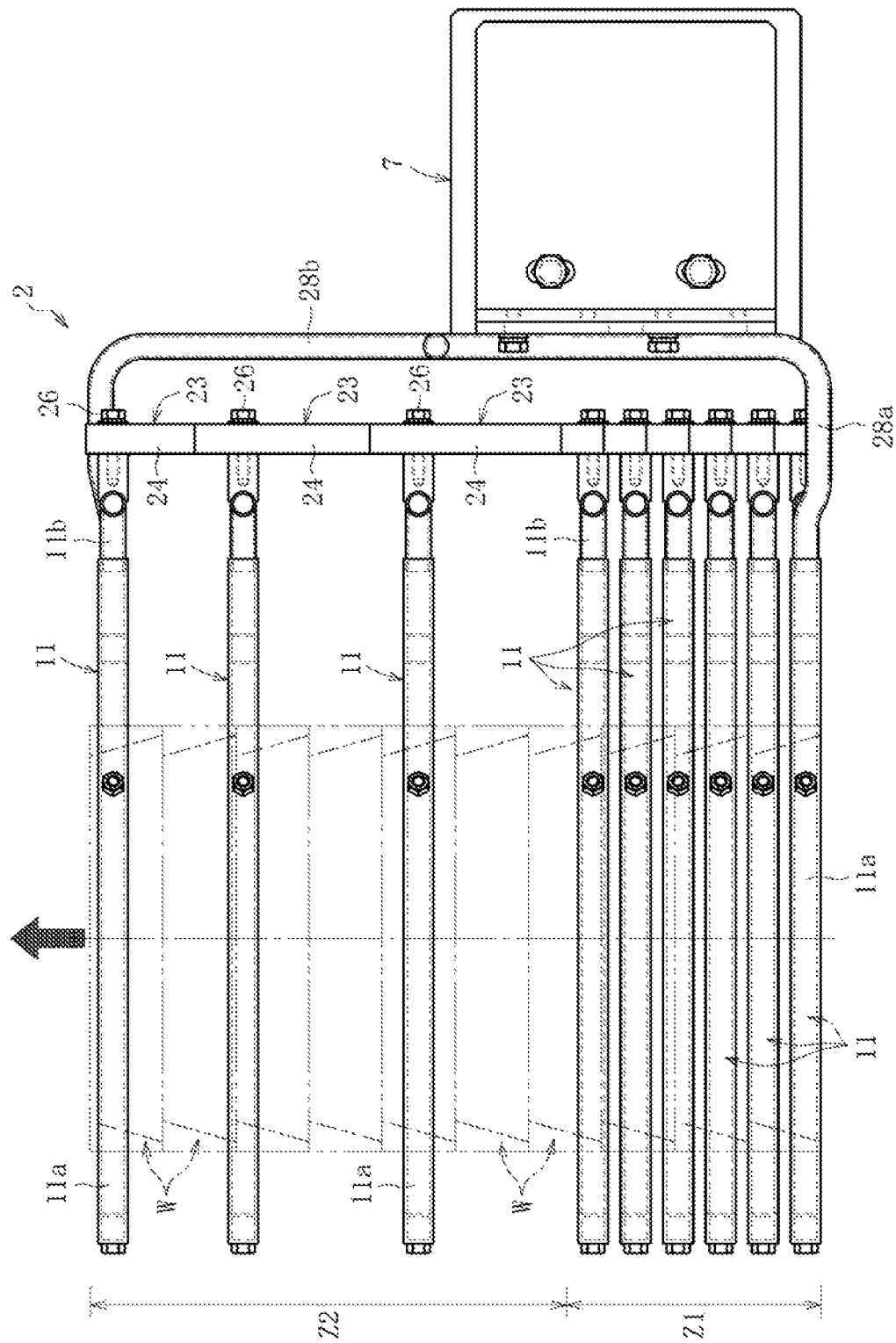
FIG. 10 is a schematic front view of the heating unit illustrated in FIG. 3, and is an illustration of a state in which a heating step is carried out in the heating unit.

As the frame body 21 including the support columns 21b that forms the heating unit 2 and supports the plurality of coil members 11, a frame body having a sufficiently large axial dimension as compared to that of the workpiece W, more specifically, when the axial dimension of the workpiece W is L, a frame body having at least an axial dimension expressed by (L×2) is used so that the plurality of workpieces W stacked in levels can be inductively heated in a simultaneous manner. In this embodiment, the support columns 21b each having the axial dimension expressed by (L×10) or larger are used so that ten workpieces W can be inductively heated in a simultaneous manner as illustrated in FIG. 10.

As illustrated in FIG. 3 to FIG. 5, the heating unit 2 comprises connecting components 23, which are configured to electrically connect the two coil members 11 that are vertically adjacent to each other. Hence, in this embodiment, the uppermost coil member 11 and the lowermost coil member 11 are electrically connected to the high-frequency power source 4 (see FIG. 1) through intermediation of the relay component 7. For description of the two coil members 11 that are vertically adjacent to each other, the coil member 11 that is arranged relatively on the upper side is referred to as "coil member 11A", and the coil member 11 that is arranged relatively on the lower side is referred to as "coil member 11B" for convenience. In the drawings, the coil members are not discriminably indicated by the reference symbols 11A and 11B.

Figure 8A:
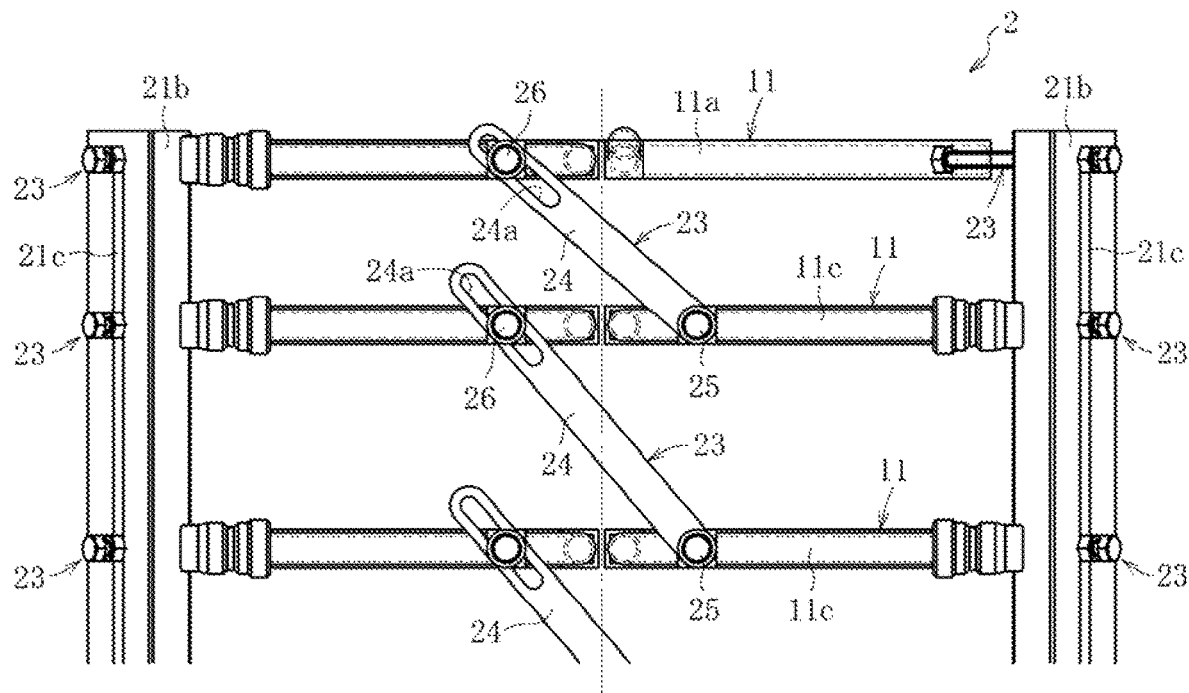
FIG. 8A is a partial side view of the heating unit illustrated in FIG. 3.
Figure 8B:
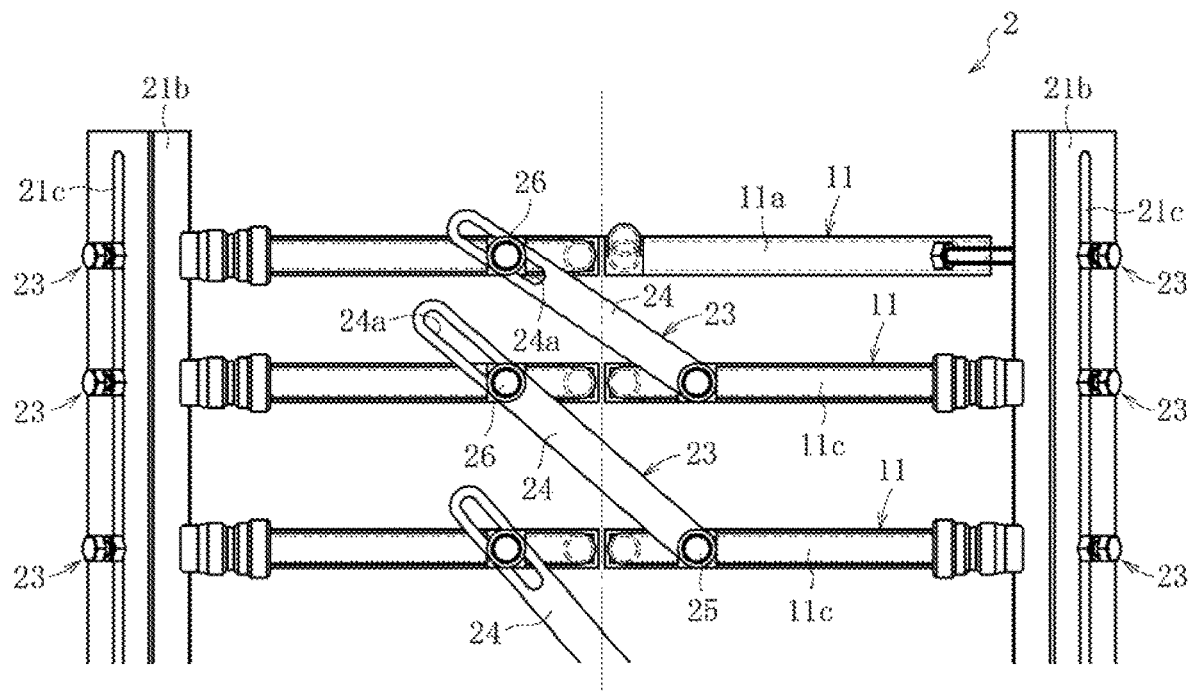
FIG. 8B is a partial side view of the heating unit illustrated in FIG. 3, and is an illustration of a state in which a coil pitch is changed from that in a state illustrated in FIG. 8A.

As illustrated in detail in FIG. 4, each of the connecting components 23 comprises a link member 24, a first coupling member 25, and a second coupling member 26. The link member 24 has a linear shape. The first coupling member 25 couples one end (lower end) of the link member 24 to the coil member 11B, specifically, a receiving member 12 made of a conductive metal welded to the extending portion 11c of the coil member 11B (see FIG. 6 and FIG. 7) so that the one end is rotatable relative to the coil member 11B. The second coupling member 26 couples another end (upper end) of the link member 24 to the coil member 11A, specifically, a receiving member 12 made of a conductive metal welded to the extending portion 11b of the coil member 11A (see FIG. 6 and FIG. 7) so that the another end is slidable and rotatable relative to the coil member 11A. Each of the link member 24, the first coupling member 25, and the second coupling member 26 is formed of a metal material (metal rigid member) having conductivity. Therefore, the coil members 11A and 11B that are vertically adjacent to each other are connected to each other not only electrically but also mechanically through intermediation of the connecting component 23 and the receiving members 12. A through hole 24a having an elongated hole shape is formed in another end of the link member 24. The second coupling member 26 is fastened to the coil member 11A through the through hole 24a. In this manner, the link member 24 is slidable and rotatable relative to the coil member 11A. Therefore, as illustrated in FIG. 8A and FIG. 8B, a separation distance (coil pitch) between the coil members 11A and 11B that are vertically adjacent to each other can be adjusted in a stepless manner within a range of a longitudinal dimension of the through hole 24a. Therefore, coil-pitch adjustment work can be efficiently carried out.

The first coupling member 25 and the second coupling member 26 can be mounted to and removable from the receiving members 12 provided to the coil member 11. Therefore, for replacement of any one of the coil members 11 by a new one or the like, when the coil member 11 is removed from the frame body 21, the connecting component 23 is also removed from the coil member 11.

The heating unit 2 comprises the cooling circuit, which is configured to cool the coil members 11. With the cooling circuit, temperature control can be appropriately and efficiently performed for the coil members 11 (the coil portion 11a). The cooling circuit of this embodiment is one-system cooling circuit, and is formed by connecting a water supply pipe 28a to an end (free end of the extending portion 11b) of the lowermost coil member 11 and a water discharge pipe 28b to an end (free end of the extending portion 11c) of the uppermost coil member 11 and bringing an internal space of the coil member 11A and an internal space of the coil member 11B, which are vertically adjacent to each other, into communication with each other through a communication member 29, as illustrated in FIG. 3 to FIG. 5. The communication member 29 is formed of a tubular member made of a flexible material, a rubber material in this embodiment, and has one end connected to an open end of the coil member 11A and another end connected to an open end of the coil member 11B.

The formation of the communication member 29 of the flexible material allows the adjustment of the coil pith without cancelling a connecting state between the communication member 29 and the coil members 11A and 11B. For preventing complication of illustration, the communication members 29 are not illustrated in the drawings other than in FIG. 5.

A flow of cooling water is now described briefly with reference to FIG. 9. The cooling water supplied from a water storage tank (not shown) flows into the internal space of the lowermost coil member 11 through the water supply pipe 28a and then circulate alternately through internal spaces of the communication members 29 (not shown in FIG. 9) and the internal spaces of the coil members 11 to flow upward, as indicated by the outlined arrows in FIG. 9. Then, the cooling water, which has circulated through the internal space of the uppermost coil member 11, is discharged to the outside through the water discharge pipe 28b connected to the extending portion 11c of the uppermost coil member 11 (see FIG. 5 together).

The heating unit 2 mainly has the configuration described above. For practical use, the separation distance (coil pitch) between the coil members 11A and 11B that are vertically adjacent to each other is suitably adjusted. More specifically, for example, the coil pitch is set relatively small on a heating start side (lower side in this embodiment), whereas the coil pitch is set relatively large on a heating end side (upper side in this embodiment). Through setting of the coil pitch as described above, a temperature increasing zone Z1 in which the workpieces W are actively heated until a temperature of the workpieces W reaches a predetermined temperature is formed in a lower region of the heating unit 2, whereas a soaking zone Z2 in which the workpieces W are held at a given temperature for a predetermined time period, specifically, the workpieces W are soaked is formed in an upper region of the heating unit 2, as illustrated in FIG. 3, FIG. 4, and FIG. 10.

Now, an embodiment of quench hardening for the workpiece W using the heat treatment apparatus 1 having the configuration described above is described.

The quench hardening involves, as illustrated in FIG. 2, the heating step S1 of inductively heating the workpieces W to a target temperature, the conveying step S2 of conveying the workpieces W heated to the target temperature to the cooling part 6, and the cooling step S3 of cooling the workpieces W for quench hardening.

(A) Heating Step S1

In the heating step S1, the plurality of workpieces W that are held coaxially on the holding part 3 (see FIG. 1) are inductively heated to the target temperature in a sequential manner. More specifically, the plurality of workpieces W are first stacked on the holding part 3 so that the center axes thereof match each other. When the workpiece W is, for example, the outer ring for a rolling bearing, the workpiece W has an axial dimension smaller than a radial dimension. Therefore, the stacking of the workpieces W has an advantage in that a posture of each of the workpieces W becomes stable while the heating step S1 is being carried out. Although not shown in detail, stacking work for the workpieces W can be performed automatically.

When the drive mechanism (not shown) is activated to apply an upward feeding force to the plurality of workpieces W that are coaxially held in the stacked state, the workpieces W are introduced into the inner periphery of the heating unit 2 (coil portion 11A) in an energized state through a lower end opening of the heating unit 2. Then, by the continuous activation of the drive mechanism, the workpieces W are intermittently fed upward and are finally discharged to the outside of the heating unit 2 through an upper end opening of the heating unit 2 (see FIG. 10 for the procedure described above). The temperature increasing zone Z1 and the soaking zone Z2 described above are formed in the lower region and the upper region of the heating unit 2, respectively. Therefore, the workpieces W introduced into the inner periphery of the heating unit 2 are inductively heated until the temperature thereof reaches the predetermined temperature while passing through the temperature increasing zone Z2, and are then held at the given temperature while passing through the soaking zone Z2. In this manner, the workpieces W are inductively heated to the target temperature. In addition, the entire workpiece W can be heated to an approximately equal temperature without varying the temperature of the workpiece W among each parts in the circumferential direction of the workpiece W.

(B) Conveying Step S2

In the conveying step S2, the workpieces W heated to the target temperature are sequentially conveyed to the cooling part 6 (cooling liquid bath 61) by the conveying mechanism 5 (see FIG. 1).

(C) Cooling Step S3

In the cooling step S3, the workpieces W that have been conveyed to the cooling liquid bath 61 by the conveying mechanism 5 are immersed into the cooling liquid 62 stored in the cooling liquid bath 61 to be cooled to a temperature in a predetermined temperature range so as to be quench-hardened (see FIG. 1).

Through the procedure described above, the quench hardening for the workpieces W using the heat treatment apparatus 1 is completed. The workpieces W for which the quench hardening has been completed are then subjected to a predetermined treatment such as tempering and various types of finishing treatments. In this manner, the workpieces W are obtained as completed pieces.

As described above, according to the heat treatment apparatus 1 of the present invention, the plurality of coil members 11 each having the coil portion 11a are supported on the frame body 21 so as to be movable upward and downward relative to the frame body 21. Therefore, the coil pitch can be easily and quickly adjusted and set. In addition, even after the adjustment of the coil pitch, the posture of each individual coil member 11, specifically, each individual coil portion 11a can be kept in an appropriate state, specifically, in a posture parallel to the workpieces W to be subjected to the heat treatment. Further, each of the coil members 11 is supported on the frame body 21 in the form of being separated from and being independent of the other coil members 11. Thus, even after the coil pitch is adjusted, the coil pitch does not gradually change in the circumferential direction of the workpiece W, or the shape of the coil portion 11a is not changed, unlike the case of adjusting the coil pitch of the helical coil 200 illustrated in FIG. 23. Therefore, besides the adjustment of the coil pitch as described above, the temperature increasing zone Z1 is formed in the lower region of the heating unit 2, while the soaking zone Z2 is formed in the upper region of the heating unit 2. In this manner, along with the passage of the workpieces W through regions respectively opposed to the coil portions 11a, each of the workpieces W can be inductively heated to the target temperature in an appropriate manner without varying the temperature of the workpiece W in the circumferential direction.

Figure 23:
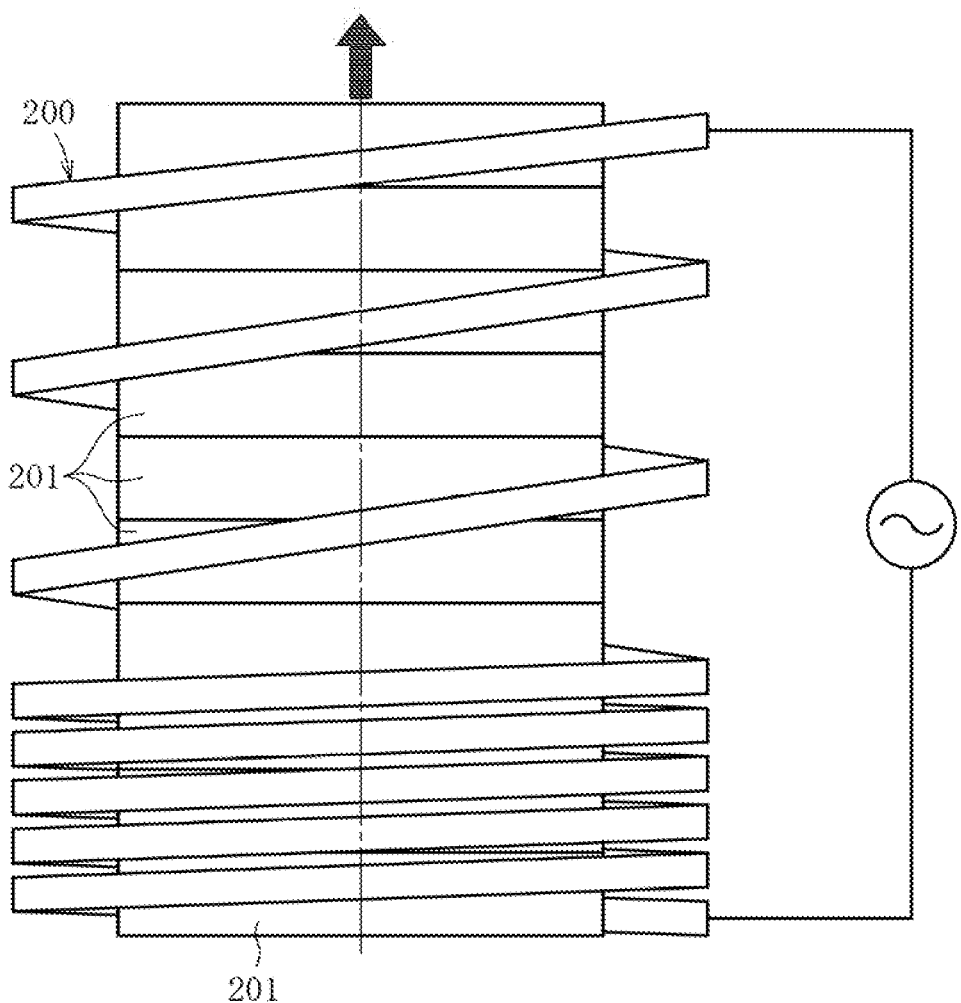
FIG. 23 is a schematic front view of a heating unit in the heat treatment apparatus used in a process of examination of the present invention.

Even when a workpiece having a different axial dimension is used to replace the workpiece W as a workpiece to be subjected to the heat treatment, each of the coil members 11 is brought into a state of being movable upward and downward relative to the frame body 21 through operation of the support components 22. Thereafter, by re-fixing each of the coil members 11 to the frame body 21 at a suitable position and in an appropriate posture, the coil-pitch adjustment work can be completed. Therefore, it is not required to prepare a large number of coils, which are required in the case in which the helical coil 200 illustrated in FIG. 23 is used, in accordance with the axial dimensions of the workpieces W. Therefore, an expenditure on equipment can be reduced.

As described above, according to the present invention, there can be achieved the beat treatment apparatus 1 that is capable of inductively heating the workpieces W to be subjected to the heat treatment to the target temperature in an appropriate manner without varying the temperature of the workpiece in the circumferential direction of the workpiece W and, even when the workpiece W to be subjected to the heat treatment is replaced by another type of one or the like, easily and quickly setting an optimum coil pitch (heating condition) in accordance with the replacing workpiece W.

Next, a heating unit 102 in a second embodiment of the present invention is described in detail with reference to FIG. 11 to FIG. 18.

Figure 11:
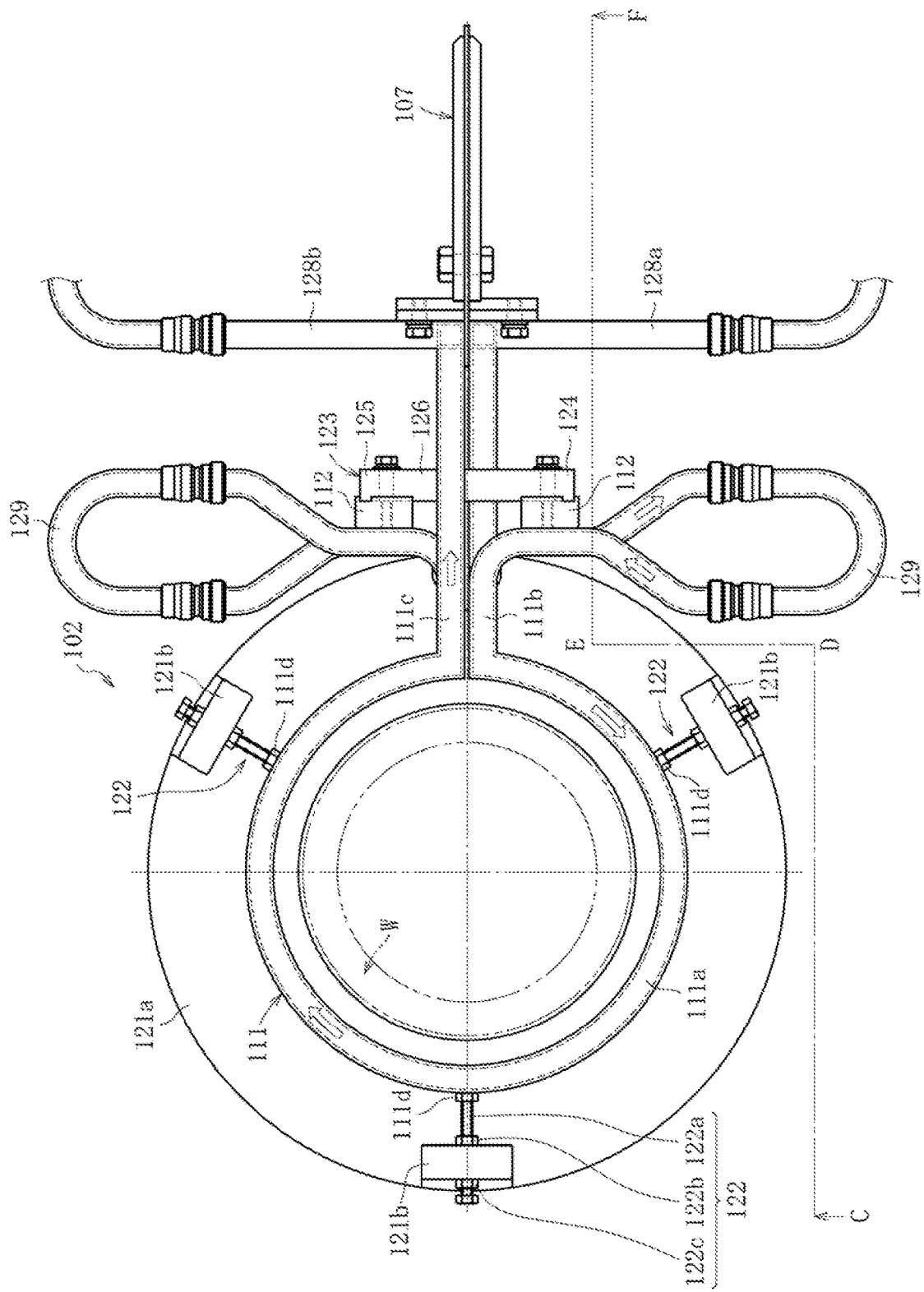
FIG. 11 is a plan view (top view) of a heating unit in a second embodiment of the present invention.
Figure 12:
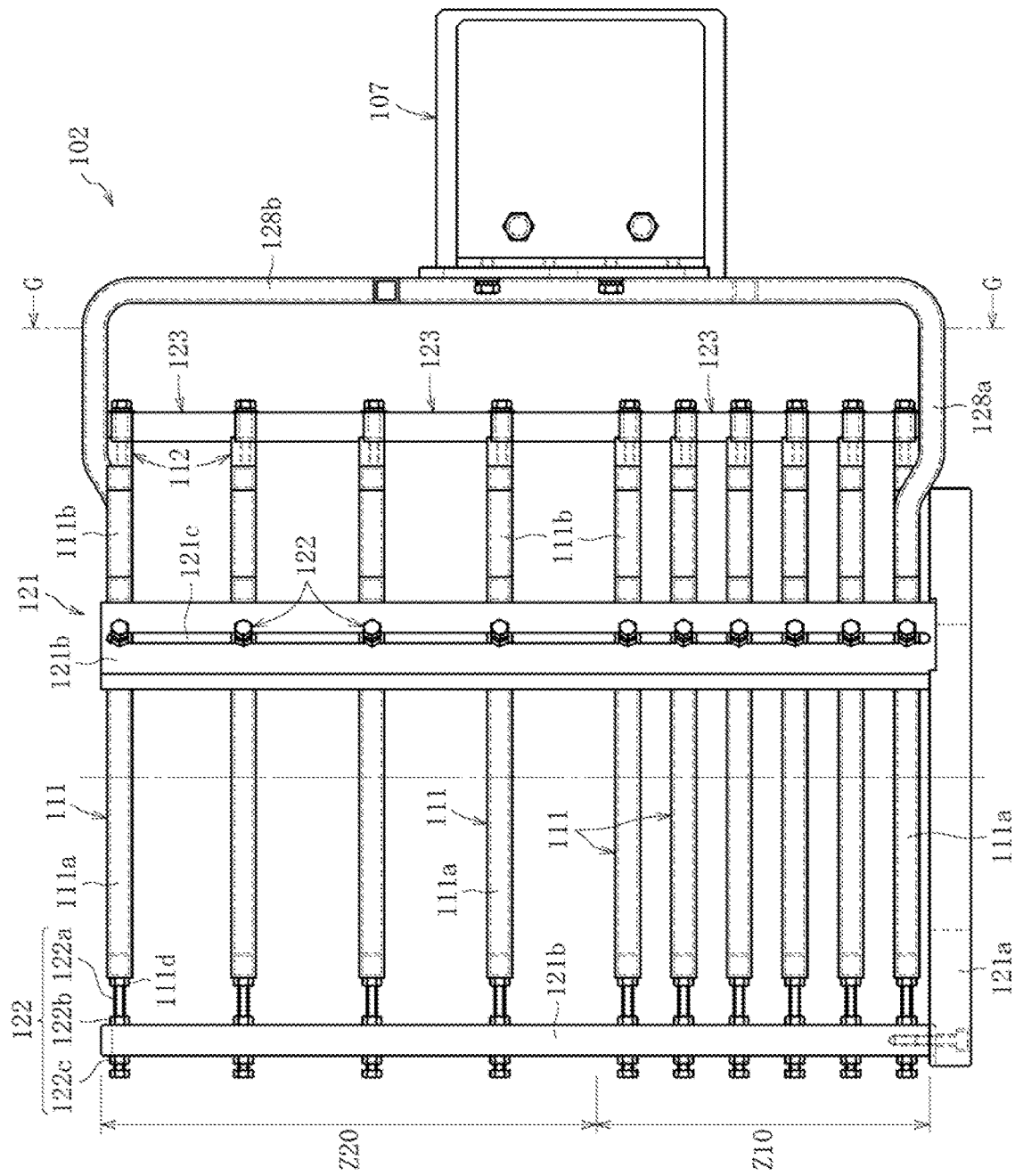
FIG. 12 is a sectional view taken along the line C-D-E-F of FIG. 11 as seen in the direction indicated by the arrows.
Figure 13:
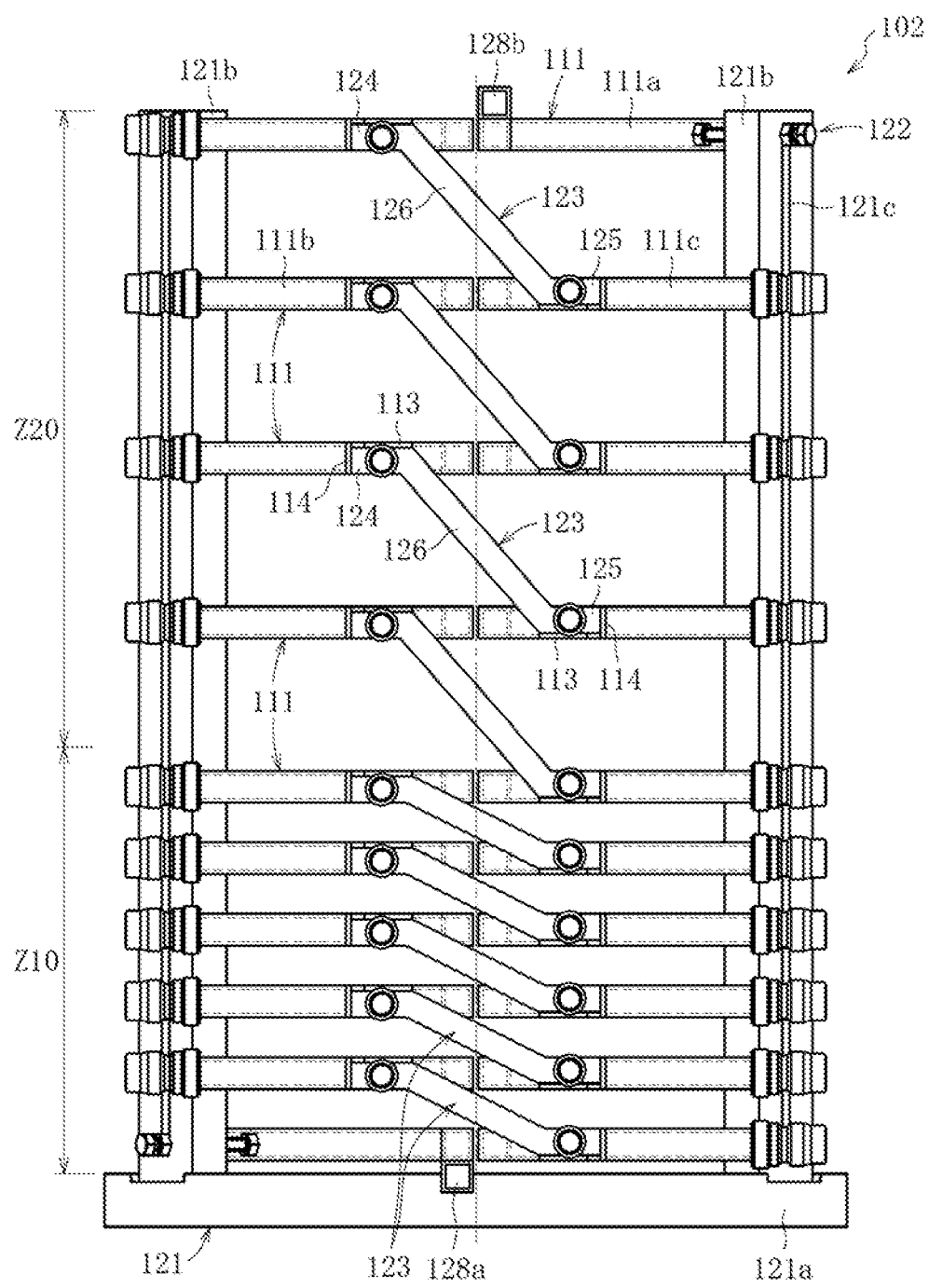
FIG. 13 is a sectional view taken along the line G-G of FIG. 12 as seen in the direction indicated by the arrows.

As illustrated in FIG. 11 to FIG. 13, the heating unit 102 comprises a plurality of (ten in the illustrated example) coil members 111, a frame body 121, and a relay component 107. The coil members 111 are arranged in multiple levels along the vertical direction. The frame body 121 supports each of the coil members 111 so that the coil members 111 can be moved upward and downward. The relay component 107 is configured to bring electrodes provided to the coil members 111 and an electrode of the high-frequency power source 4 (see FIG. 1) into contact with each other to energize the coil members 111.

Figure 14:
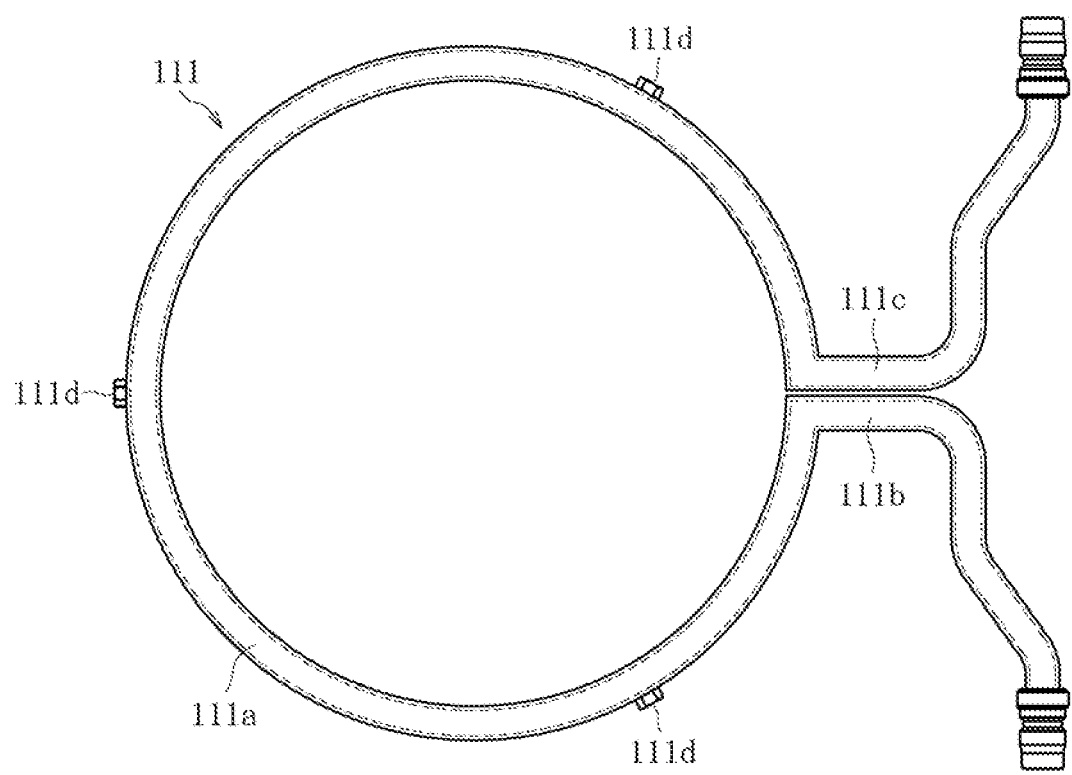
FIG. 14 is a plan view of one coil member which forms the heating unit illustrated in FIG. 11.
Figure 15:
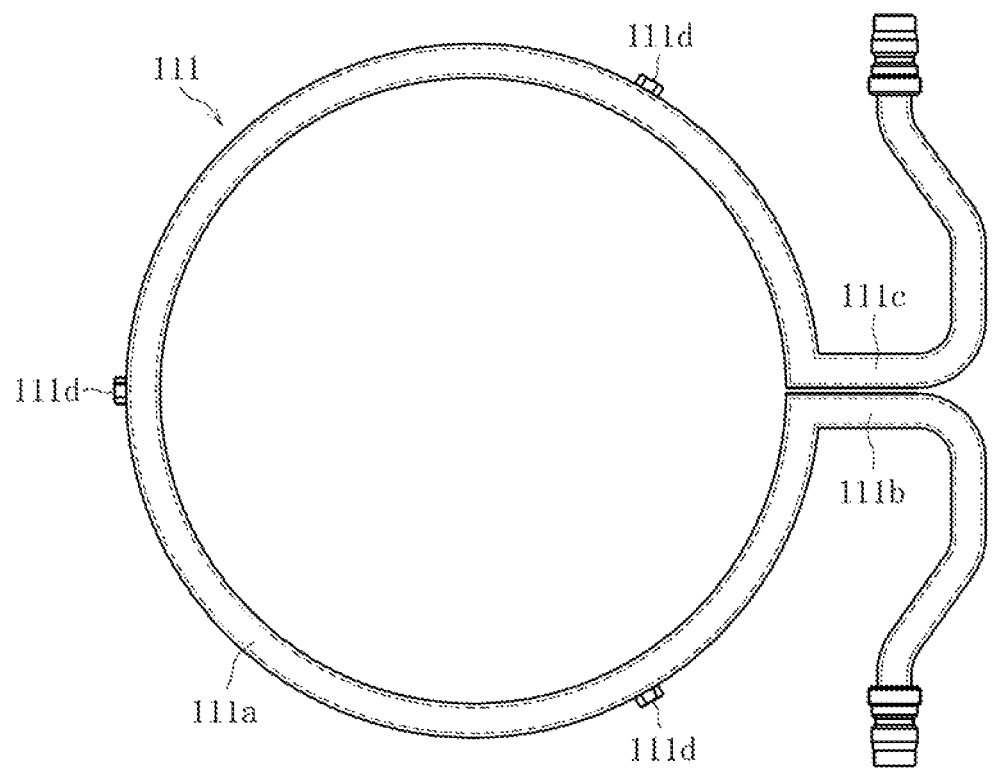
FIG. 15 is a plan view of another coil member which forms the heating unit illustrated in FIG. 11.

As illustrated in FIG. 11, each of the coil members 111 comprises a coil portion 111a. The coil portion 111a is arranged coaxially with the workpieces W held by the holding part 3 (see FIG. 1), and is formed into a ring shape having ends in a circumferential direction of the workpiece W so as to be capable of surrounding the workpiece W. Further, each of the coil members 111 has extending portions 111b and 111c respectively extending from one circumferential end and another circumferential end of the coil portion 111a. In this embodiment, two kinds of coil members 111 having the shapes of the extending portions 111b and 111c being different from each other are arranged alternately between the uppermost coil member 111 and the lowermost coil member 111. One of the two kinds of coil members 111 is illustrated in FIG. 14, and another thereof is illustrated in FIG. 15. The one coil member 111 illustrated in FIG. 14 comprises the extending portions 111b and 111c respectively having free ends that are arranged at positions relatively away from the coil portion 111a. The another coil member 111 illustrated in FIG. 15 comprises the extending portions 111b and 111c respectively having free ends that are arranged at positions relatively close to the coil portion 111a. These arrangements are used to prevent the extending portions 111b and 111c of the adjacent coil members 111 from interfering with each other.

Each of the coil members 111 is formed into a shape having ends by curving a tubular member made of a conductive metal, for example, a copper pipe. At least each part of the coil portion 111a in an extending direction (circumferential direction) thereof are positioned on the same plane. As illustrated in FIG. 11 to FIG. 13, each of the coil members ill is supported on the frame body 121 in a horizontal posture in a state in which a center axis of the coil portion 111a matches center axes of the coil portions 111a of the other coil members 111 and a phase in which circumferential ends of the coil portions 111a are present matches a phase in which circumferential ends of the coil portions 111a of the other coil members 111 are present.

A receiving member 112 made of a conductive metal is welded to each of the coil members 111. One end or another end of a restricting member 123 described later is mounted and fixed (fastened with a bolt) to the receiving member 112. In the uppermost coil member 111, the receiving member 112 is welded only to the first extending portion 111b. In the lowermost coil member 111, the receiving member 112 is welded only to the second extending portion 111c. The receiving members 112 are welded to both of the first extending portion 111b and the second extending portion 111c of each of a total of eight coil members 111 that are arranged between the uppermost coil member 111 and the lowermost coil member 111.

As illustrated in FIG. 11 to FIG. 13, the frame body 121 comprises a seat 121a and a plurality of (three in this embodiment) support columns 121b. The seat 121a is arranged below the lowermost coil member 111. The support columns 121b are provided upright on the seat 121a. Each of the coil members 11 is supported on the frame body 121 through support components 122 that are provided at three positions separated from each other in the circumferential direction of the coil portion 111a. A guide portion 121c, which is configured to guide the upward and downward movement of the coil member 111, is formed in each of the support columns 121b. The guide portion 121c comprises an elongated through hole extending in the vertical direction. Each of the seat 121a and the support columns 121b is made of an insulating material.

Each of the support components 122 comprises a bolt member 122a, a first nut 122b, and a second nut 122c. The bolt member 122a has a radially inner end to be fastened to a nut 111d fixed to an outer periphery of the coil member 111, and a radially outer end with a vicinity thereof to be inserted into the guide portion 121c of the corresponding support column 121b. The first nut 122b is arranged on a radially inner side of the support column 121b, and a second nut 122c is arranged on a radially outer side of the support column 121b. The first nut 122b and the second nut 122b are threadably fixed to the bolt member 122a so as to be capable of moving closer and away relative to each other.

With the configuration described above, when the nuts 122b and 122c are moved closer relative to each other in each of the support components 122 provided at the three positions in the circumferential direction to sandwich the support column 121b therebetween, each of the coil members 111 is fixedly supported at a predetermined position in the vertical direction. On the contrary, when the nuts 122b and 122c are moved away relative to each other in each of the support components 122 to release a force of sandwiching the support column 121b, the coil member 111 can be moved upward and downward, specifically, a position of fixation and a posture of the coil member 111 in the vertical direction can be adjusted. Further, with the configuration described above, when the bolt members 122a are removed from the nuts 11d in all the support components 122 provided to each of the coil members 111, the coil member 111 can be removed from the frame body 121. Therefore, each of the coil members 111 can be moved upward and downward relative to the frame body 121, and can also be mounted to and removed from the frame body 121.

As illustrated in FIG. 11 to FIG. 13, the heating unit 102 comprises a plurality of restricting members 123, which are configured to restrict relative approaching and separating movement of the two coil members 111 that are vertically adjacent to each other. For description of the two coil members 111 that are vertically adjacent to each other, the coil member 111 that is arranged relatively on the upper side is referred to as "coil member 111A", and the coil member 111 that is arranged relatively on the lower side is referred to as "coil member 111B" for convenience. In the drawings, the coil members are not discriminably indicated by the reference symbols 111A and 111B.

Each of the restricting members 123 is made of a metal material having conductivity, and comprises a first head portion 124, a second head portion 125, and a connecting portion 126. The first head portion 124 is fastened with a bolt to the coil member 111A, specifically, to the receiving member 112 welded to the first extending portion 111b of the coil member 111A. The second head portion 125 is fastened with a bolt to the coil member 111B, specifically, to the receiving member 112 welded to the second extending portion 111c of the coil member 111B. The connecting portion 126 is inclined at a predetermined angle with respect to the vertical direction, and is provided between the head portions 124 and 125. The restricting member 123 made of the conductive metal is fastened with a bolt to the coil member 111 as described above. As a result, the coil members 111A and 111B are electrically connected through intermediation of the restricting member 123, the receiving members 112, and the bolts described above. Therefore, in this embodiment, the uppermost coil member 111 and the lowermost coil member 111 of the plurality of coil members 111 that are arranged in multiple levels are electrically connected to the high-frequency power source 4 (FIG. 1) through intermediation of the relay component 107.

Figure 16:
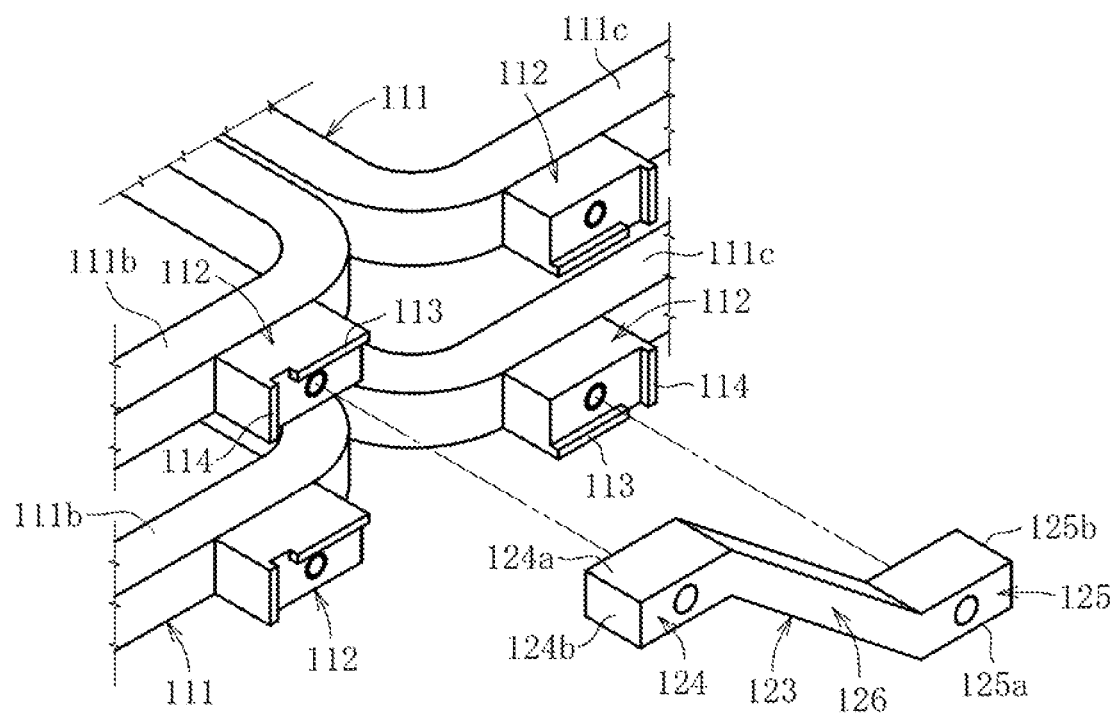
FIG. 16 is a partially enlarged perspective view of FIG. 13.
Figure 17:
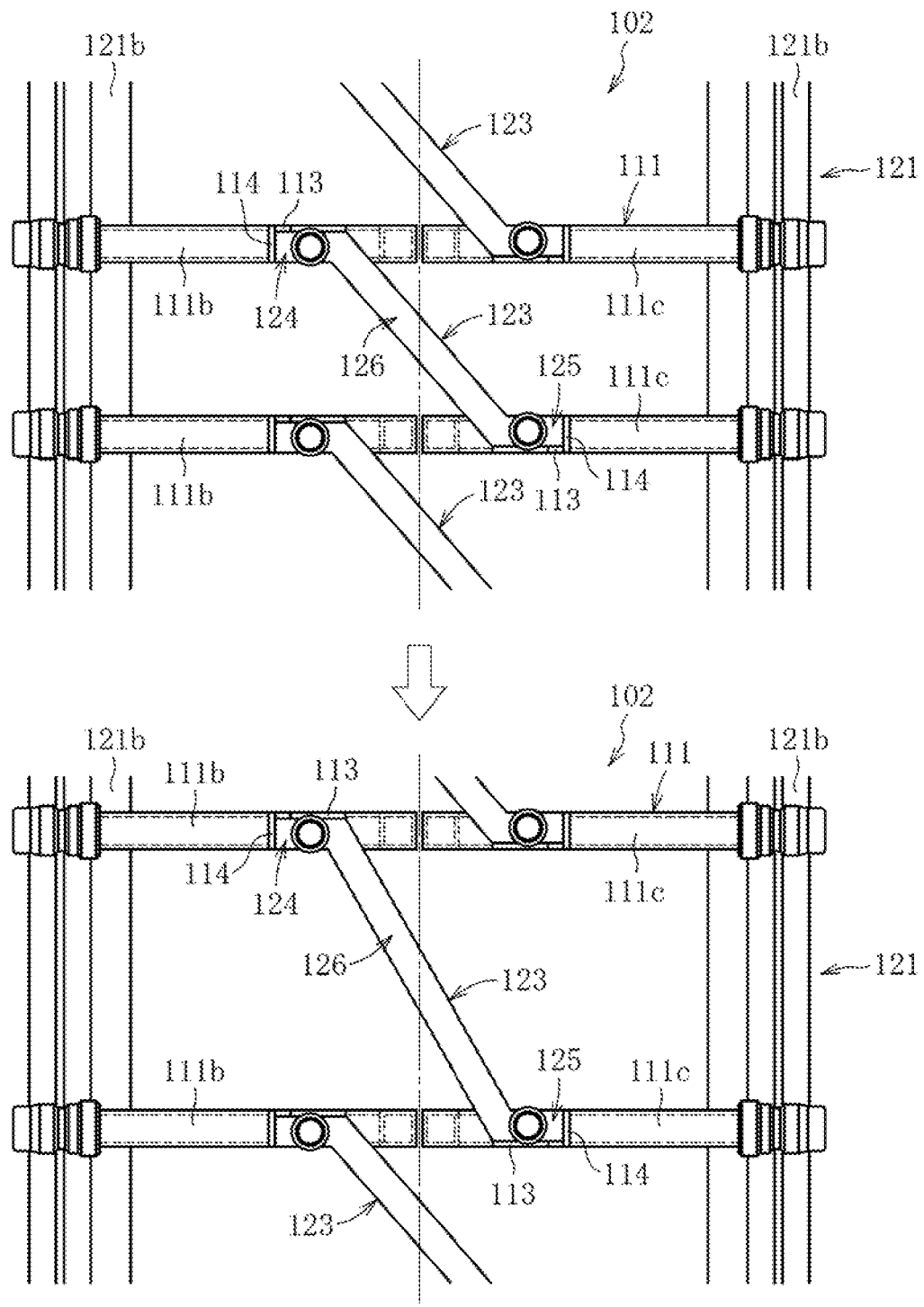
FIG. 17 is an explanatory view for illustrating a modification mode of a coil pitch in the heating unit illustrated in FIG. 11.

As illustrated in FIG. 16 in an enlarged manner, the receiving member 112 welded to the first extending portion 111b of each of the coil members 11 has a first projection 113 and a second projection 114 which can be engaged with an upper end portion 124a and a circumferential end surface 124b of the first head portion 124 of the restricting member 123, respectively, whereas the receiving member 112 welded to the second extending portion 111c of each of the coil members 111 has the first projection 113 and the second projection 114 which can be engaged with a lower end surface 125a and a circumferential end surface 125b of the second head portion 125 of the restricting member 123, respectively. Specifically, each of the coil members 111 has the first projection 113, which is engaged with the restricting member 123 in the axial direction, and the second projection 114, which is engaged with the restricting member 123 in the extending direction (circumferential direction) thereof.

In the second embodiment, the two kinds of restricting members 123 having axial dimensions different from each other are used. More specifically, as illustrated in FIG. 12 and FIG. 13, the restricting members 123 each having a relatively small axial dimension are mounted to the coil members 111A and 111B, that is, from the lowermost coil member 111 to the sixth coil member 111 from the bottom, whereas the restricting members 123 each having a relatively large axial dimension are mounted to the coil members 111A and 111B, that is, from the sixth coil member 111 from the bottom to the uppermost coil member 111. With the configuration described above, in the lower region of the heating unit 102, specifically, on a side where the heating step S2 is started, there is formed a temperature increasing zone Z10 in which the coil pitch is set relatively small and the workpieces W can be actively heated until the temperature thereof reaches the predetermined temperature. Further, in the upper region of the heating unit 102, specifically, on a side where the heating step S2 ends, there is formed a soaking zone Z20 in which the coil pitch is set relatively large and the workpieces W can be soaked.

The cooling circuit which is configured to cool the coil members 111 can be provided to the heating unit 102. With such cooling circuit, temperature control can be appropriately and efficiently performed for the coil members 111. The cooling circuit of this embodiment is one-system cooling circuit, and is formed by connecting a water supply pipe 128a to a free end of the extending portion 111b of the lowermost coil member 111 and a water discharge pipe 128b to a free end of the extending portion 111c of the uppermost coil member 111 and bringing an internal space of the coil member 111A and an internal space of the coil member 111B, which are vertically adjacent to each other, into communication with each other through a communication member 129, as illustrated in FIG. 11 and FIG. 12. The communication member 129 is formed of a tubular member made of a flexible material, a rubber material in this embodiment, and has one end connected to the free end of the coil member 111A and another end connected to the free end of the coil member 111B. The formation of the communication member 129 of the flexible material allows the adjustment of the coil pith without cancelling a connecting state between the communication member 129 and the coil members 111A and 111B. For preventing complication of illustration, the communication members 129 illustrated only in FIG. 11.

Figure 18:
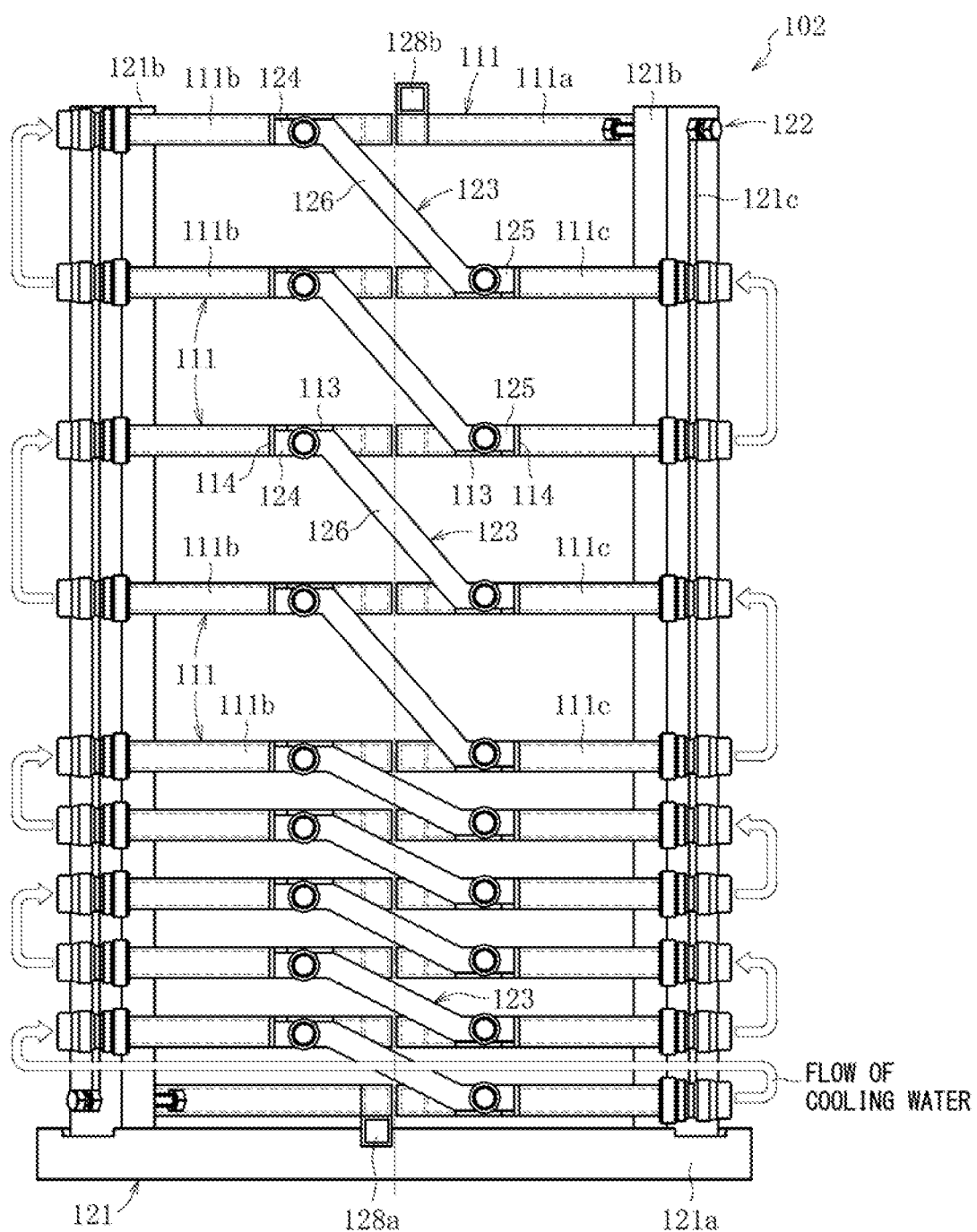
FIG. 18 is an explanatory schematic view for illustrating a flow of cooling water in the heating unit illustrated in FIG. 11.

A flow of cooling water in the heating unit 102 in this embodiment is now described briefly with reference to FIG. 18. The cooling water supplied from a water storage tank (not shown) flows into the internal space of the lowermost coil member 111 through the water supply pipe 128a and then circulate alternately through internal spaces of the communication members 129 (not shown in FIG. 18) and the internal spaces of the coil members 111 to flow upward, as indicated by the outlined arrows in FIG. 18. Then, the cooling water, which has circulated through the internal space of the uppermost coil member 111, is discharged to the outside through the water discharge pipe 128b connected to the extending portion 111c of the uppermost coil member 111 (see FIG. 11 together).

When the heat treatment apparatus 1 comprising the heating unit 102 having the configuration described above is used, the quench hardening on the workpieces W is carried out in the same procedure as that in the case in which the heat treatment apparatus 1 comprising the heating unit 2 illustrated in FIG. 3 and the like is used.

According to the heat treatment apparatus 1 comprising the heating unit 102 described above, the coil members 111 each comprising the coil portion 111a are supported so as to be movable upward and downward relative to the frame body 121. As a result, the coil pitch can be adjusted and set by adjusting the position and the posture of each of the coil members 111 relative to the frame body 121. In addition, even after the adjustment of the coil pitch, the posture of each individual coil member 111, specifically, each individual coil portion 111a can be kept in an appropriate state, specifically, in a posture parallel to the workpieces W to be subjected to the heat treatment. Further, each of the coil members 111 is supported on the frame body 121 in the form of being separated from and being independent of the other coil members 111. Thus, even after the coil pitch is adjusted, the coil pitch does not gradually change in the circumferential direction of the workpiece W, or the shape of the coil portion 111a is not changed, unlike the case of adjusting the coil pitch of the helical coil 200 illustrated in FIG. 23. Therefore, besides the adjustment of the coil pitch as described above, the temperature increasing zone Z10 is formed in the lower region of the heating unit 2, while the soaking zone Z20 is formed in the upper region of the heating unit 2. In this manner, along with the passage of the workpieces W through regions respectively opposed to the coil portions 111a, each of the workpieces W can be inductively heated to the target temperature in an appropriate manner without varying the temperature of the workpiece W in the circumferential direction.

Further, when the heating unit 102 described above is adopted, the coil pitch can be set based on the axial (vertical) dimension of the relative members 123. Therefore, for example, when the workpiece W to be subjected to the heat treatment is replaced by a workpiece having a different axial dimension (referred to as "workpiece W'"), the restricting member 123 is removed. Then, another restricting member 123, that is, the restricting member 123 having an axial dimension different from that of the restricting member 123 removed from the coil member 111 is fastened with a bolt to one and another of the two adjacent coil members 111, at least one of which is brought into a state of being movable upward and downward. As a result, an optimum coil pitch in accordance with the workpiece W' can be easily and accurately set, specifically, the heating unit 102 can be easily changed into a form in which the workpiece W' can be inductively heated in an appropriate manner (see FIG. 17 for the form described above). In the second embodiment, in particular, the first projection 113 and the second projection 114, which are engaged with the restricting member 123 in the axial direction and the circumferential direction, respectively, are formed on each of the coil members 111, specifically, the receiving member 112 welded thereto. Therefore, coil-pitch adjustment and setting work can be further facilitated. In addition, after the adjustment of the coil pitch, the movement of the two adjacent coil members 111 relative to each other can be reliably restricted.

In short, when the heating unit 102 of the second embodiment is adopted, the coil pitch can be further easily and accurately adjusted and set in accordance with a size of the workpiece W, a temperature history of the workpiece to be acquired at the time of passage through the heating unit 102, and the like. Therefore, the heating unit 102 can be easily and accurately changed from the form in which one temperature increasing zone Z10 and one soaking zone Z20 are formed to a mode in which, for example, two temperature increasing zones Z10 and two soaking zones Z20 are formed alternately (mode in which a first temperature increasing zone, a first soaking zone, a second temperature increasing zone, and a second soaking zone are provided in the stated order).

The embodiment of the present invention is described above, but the embodiment of the present invention is not limited to that described above.

For example, although only one-system cooling circuit is provided in the heating unit 2, 102 in the embodiments described above, two or more systems of the cooling circuits may be provided. In particular, when there is a fear in that a required coil cooling capacity cannot be obtained with the cooling circuit of one system, it is effective to provide a plurality of systems of the cooling circuits. Even when the plurality of systems of the cooling circuits are provided as described above, the heating unit 2, 102 comprises the plurality of coil members 11, 111 that are separate from each other. Therefore, the plurality of systems of the cooling circuits can be easily constructed.

Configurations of the support components 22, 122, the connecting components 23, and the restricting members 123, which are used in the embodiments described above, are merely examples, and can be suitably changed as long as the same functions are fulfilled.

Further, it has been described above that the plurality of workpieces W are inductively heated to the target temperature in a sequential manner and the workpieces W inductively heated to the target temperature are sequentially fed to the conveying step S2 and then to the cooling step S3. The conveying step S2 and the cooling step S3 may be carried out collectively for the plurality of workpieces W which have been inductively heated to the target temperature.

Further, although the direction of relative movement of the heating unit 2, 102 and the workpieces W is the vertical direction in the embodiments described above, the present invention is also applicable to the heat treatment apparatus 1, which is configured to move the heating unit and the workpieces relative to each other in the horizontal direction.

Further, the heat treatment apparatus 1 according to the present invention can be preferably applied when the heat treatment is performed not only on the outer ring for the rolling bearing but also on a ring-shaped member made of steel, for example, an inner ring for a rolling bearing, a sliding bearing, an outer joint member or an inner joint member included in a constant velocity universal joint, and a cage to be incorporated into the rolling bearing or the constant velocity universal joint.

Further, the heat treatment apparatus 1 according to the present invention can be preferably applied when the heat treatment is performed not only on the ring-shaped workpiece W but also on a disc-shaped or a columnar workpiece.

Example

For verification of utility of the present invention, it was verified whether a difference was generated in temperature (manner of temperature increase) of the workpiece when the workpiece was heated to about 900° C. in each of a case (1) in which the workpieces were inductively heated in the heat treatment apparatus using the helical coil 200 illustrated in FIG. 23 as the heating unit and a case (2) in which the workpieces were inductively heated in the heat treatment apparatus comprising the heating unit to which the present invention was applied, that is, the heat treatment apparatus 1 comprising the heating unit 2 according to the first embodiment or the heating unit 102 according to the second embodiment. In each of the cases (1) and (2), through adjustment of the coil pitch, the temperature increasing zone in which the workpieces were actively heated was formed in a pre-stage of the heating unit and the soaking zone in which the workpieces were soaked was formed in a post-stage of the heating unit.

Figure 19:
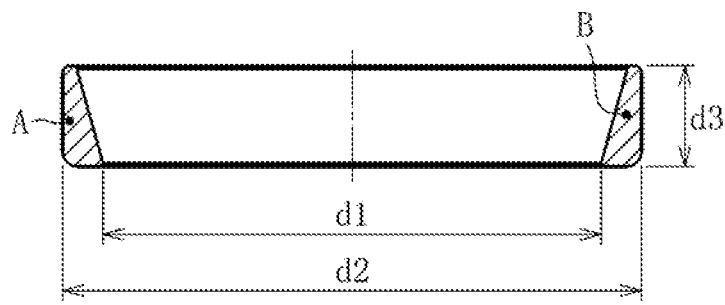
FIG. 19 is a longitudinal sectional view of a workpiece used in a verification test.

The workpiece used in this verification test was an outer ring for a rolling bearing (tapered roller bearing) that was formed so that a small-diameter side inner diameter dimension d1 was 146 mm, an outer-diameter dimension d2 was 170 mm, and an axial dimension was 29 mm, as illustrated in FIG. 19. Further, in the verification test, temperatures at two points (point A and point B) on the workpiece, which were different in phase by 180 degrees in the circumferential direction, were measured.

Figure 20:
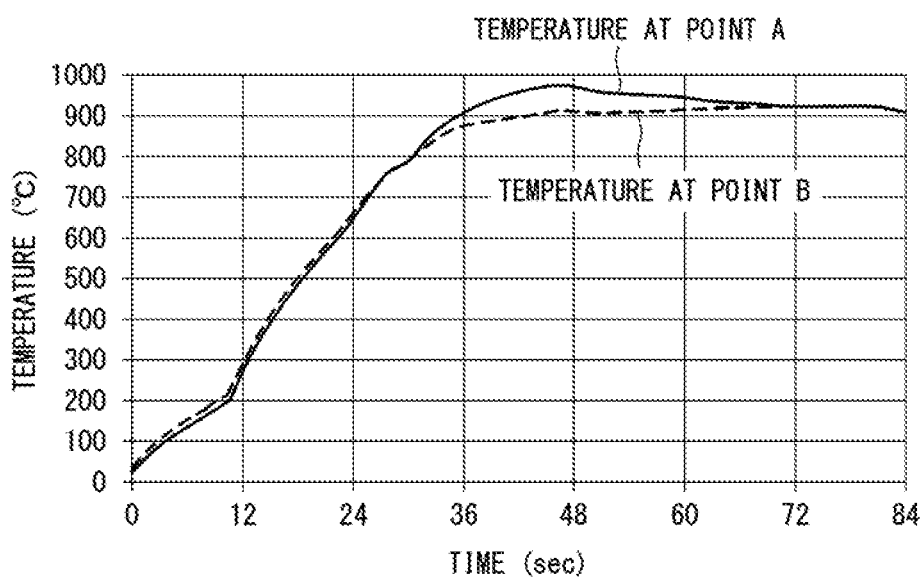
FIG. 20 is a graph for showing a temperature change in the workpiece illustrated in FIG. 19 when the workpiece is inductively heated in a heat treatment apparatus illustrated in FIG. 23.
Figure 21:
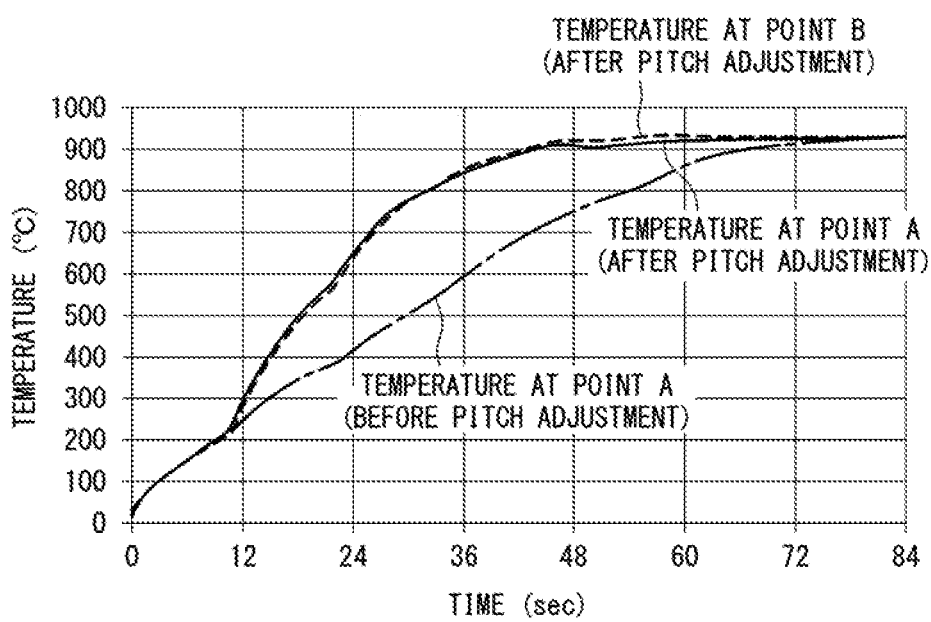
FIG. 21 is a graph for showing a temperature change in the workpiece illustrated in FIG. 19 when the workpiece is inductively heated in the heat treatment apparatus according to the present invention.

A result of temperature measurement for the workpiece in the case (1) is shown in FIG. 20, whereas a result of temperature measurement for the workpiece in the case (2) is shown in FIG. 21. As is apparent from FIG. 20, when the helical coil 200 was used to inductively heat the workpiece, the temperature of the each parts of the workpiece in the circumferential direction became uneven. On the other hand, when the apparatus according to the present invention was used to inductively heat the workpiece, the temperature of the each pans of the workpiece in the circumferential direction became approximately equal, as shown in FIG. 21 (see "TEMPERATURE AT POINT A (AFTER PITCH ADJUSTMENT)" indicated by the solid line and "TEMPERATURE AT POINT B (AFTER PITCH ADJUSTMENT)" indicated by the broken line in FIG. 21).

In order to verify effects of the coil pitch of the coils for induction heating on the manner of temperature increase of the workpiece, the workpiece was heated with the coil pitch being set constant in the heat treatment apparatus comprising the heating unit to which the present invention was applied. A result of temperature measurement at the point A on the workpiece in this case is also shown in FIG. 21 (see "TEMPERATURE AT POINT A (BEFORE PITCH ADJUSTMENT)" shown in FIG. 21). As is apparent also from FIG. 21, the temperature of the workpiece continuously increased in this case. Therefore, it is understood that it is substantially impossible to soak the workpiece.

Figure 22:
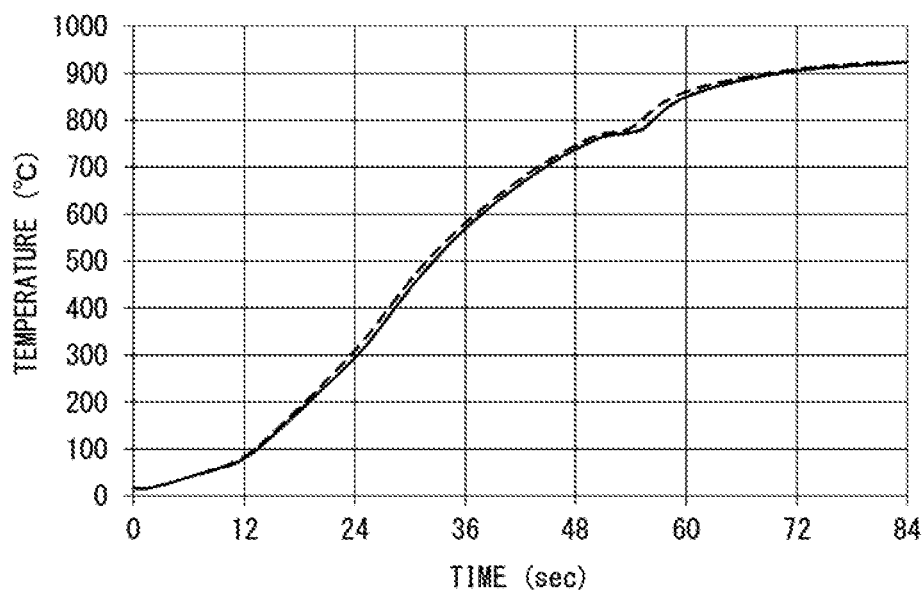
FIG. 22 is a graph for showing a test result of a coil-pitch reproducibility verification test.

Further, because of the restricting members 123 included in the heating unit 102, the heat treatment apparatus comprising the heating unit 102 illustrated in FIG. 11 and other drawings can easily and accurately achieve a predetermined coil pitch, specifically, can increase reproducibility of the coil pitch. In order to verify that the effects described above are obtained, a temperature history of the workpiece was observed in both of a case in which the workpiece was inductively heated in a first state in which the predetermined coil pitch was set and a case in which a second state in which the coil pitch was different from that in the first state was set and then the workpiece was inductively heated with the coil pitch being changed back into the first state described above. A result thereof is shown in FIG. 22. In FIG. 22, the temperature history of the workpiece in the case in which the workpiece was inductively heated in the first state for the first time is indicated by the solid line, whereas the temperature history of the workpiece in the case in which the workpiece was inductively heated in the first state for the second time is indicated by the dotted line (broken line). As is apparent from the result shown in FIG. 22, the heat treatment apparatus comprising the heating unit 102 illustrated in FIG. 11 and the other drawings provides significantly high coil-pitch reproducibility and therefore can inductively heat the workpiece to be subjected to the heat treatment with accuracy to have a desired temperature history.

From the results of verification tests described above, the following is understood. When a magnitude of the coil pitch between the coils for induction heating is adjusted and the zone with a relatively large coil pitch is formed, the workpiece can be soaked in the zone. Further, the coil having the configuration according to the present invention is used as the coil for induction heating, the temperature of the each pans of the workpiece in the circumferential direction can be equalized. Therefore, the utility of the present invention was verified.

REFERENCE SIGNS LIST 1 heat treatment apparatus
2 heating unit
3 holding part
11 coil member
11a coil portion
21 frame body
22 support component
23 connecting component
24 link member
25 first coupling member
26 second coupling member
29 communication member
102 heating unit
111 coil member
111a coil portion
113 first projection
114 second projection
121 frame body
123 restricting member
129 communication member
S1 heating step
S3 cooling step
W workpiece
Z1 temperature increasing zone
Z10 temperature increasing zone
Z2 soaking zone
Z20 soaking zone

The invention claimed is:
1. A heat treatment apparatus, comprising:
a heating unit, which is configured to inductively heat a workpiece to a target temperature; and a drive mechanism, which is configured to move a plurality of coaxially held workpieces relative to the heating unit being in an energized state in an axial direction of the workpiece, wherein the heating unit comprises:
- a plurality of coil members respectively including a coil portion arranged coaxially with the workpiece so as to be capable of surrounding the workpiece, each part of the coil portion in an extending direction of the coil portion being positioned on the same plane;
- a frame body, which is configured to support each of the plurality of coil members so as to be movable in the axial direction of the workpiece while maintaining the coaxial arrangement between the coil portions; and
- a connecting component which is configured to electrically connect two coil members of the plurality of coil members that are adjacent to each other in the axial direction of the workpiece,
  - wherein the connecting component is removably mounted to one and another of the two coil members that are adjacent to each other in the axial direction of the workpiece.

2. The heat treatment apparatus according to claim 1, wherein the connecting component comprises:
- a link member;
- a first coupling member, which is configured to couple one end of the link member to the one of the two coil members that are adjacent to each other in the axial direction of the workpiece so that the one end of the link member is rotatable relative to the one coil member; and
- a second coupling member, which is configured to couple another end of the link member to the another of the two coil members that are adjacent to each other in the axial direction of the workpiece so that the another end of the link member is slidable and rotatable relative to the another coil member.

3. The heat treatment apparatus according to claim 1, wherein the heating unit further comprises a restricting member that functions as the connecting component, and wherein the restricting member is removably mounted to the one and the another of the two coil members that are adjacent to each other in the axial direction of the workpiece, and is configured to restrict relative approaching and separating movement of the two coil members that are adjacent to each other in the axial direction of the workpiece.

4. The heat treatment apparatus according to claim 3, wherein the two of the coil members that are adjacent to each other in the axial direction of the workpiece each have has a first projection that is engageable with the restricting member in the axial direction of the workpiece and a second projection that is engageable with the restricting member in an extending direction of an associated one of the two coil members.

5. The heat treatment apparatus according to claim 1, wherein each of the plurality of coil members is formed into a shape having ends with a tubular member made of a conductive metal.

6. The heat treatment apparatus according to claim 5, wherein the heating unit further comprises a communication member, which is configured to communicate internal spaces of the two coil members that are adjacent to each other in the axial direction of the workpiece, and wherein the communication member is formed of a flexible material.

7. The heat treatment apparatus according to claim 1, wherein each of the plurality of coil members is mountable to and removable from the frame body.

8. The heat treatment apparatus according to claim 1, wherein each of the workpieces comprises a raceway ring for a rolling bearing.

9. A heat treatment method comprising a heating step of inductively heating a plurality of coaxially held workpieces to a target temperature in a sequential manner by moving the plurality of workpieces relative to a heating unit being in an energized state in an axial direction of a workpiece of the plurality of workpieces, wherein, in the heating step, the plurality of workpieces are heated by the heating unit, the heating unit comprising:
- a plurality of coil members respectively including a coil portion arranged coaxially with the workpiece so as to be capable of surrounding the workpiece, each part of the coil portion in an extending direction of the coil portion being positioned on the same plane;
- a frame body, which is configured to support each of the plurality of coil members so as to be movable in the axial direction of the workpiece while maintaining the coaxial arrangement between the coil portions; and
- a connecting component which is configured to electrically connect two coil members of the plurality of coil members that are adjacent to each other in the axial direction of the workpiece,
  - wherein the connecting component is removably mounted to one and another of the two coil members that are adjacent to each other in the axial direction of the workpiece.

10. The heat treatment method according to claim 9, wherein the heating unit further comprises a restricting member that functions as the connecting component, and wherein one end and another end of the restricting member are removably mounted to the one and the another of the two coil members that are adjacent to each other in the axial direction of the workpiece, and the restricting member is configured to restrict relative approaching and separating movement of the two coil members that are adjacent to each other in the axial direction of the workpiece.

11. The heat treatment method according to claim 9, wherein each of the workpieces comprises a raceway ring for a rolling bearing.

* * * * *